(12) United States Patent
Islam

(10) Patent No.: US 6,603,594 B2
(45) Date of Patent: Aug. 5, 2003

(54) MULTI-STAGE OPTICAL AMPLIFIER AND BROADBAND COMMUNICATION SYSTEM

(75) Inventor: Mohammed Islam, Ann Arbor, MI (US)

(73) Assignee: Xtera Communications, Inc., Allen, TX (US)

(*) Notice: Subject to any disclaimer, the term of this patent is extended or adjusted under 35 U.S.C. 154(b) by 0 days.

(21) Appl. No.: 10/007,643

(22) Filed: Mar. 19, 2002

(65) Prior Publication Data

US 2003/0058523 A1 Mar. 27, 2003

Related U.S. Application Data

(63) Continuation of application No. 09/471,753, filed on Dec. 23, 1999, now Pat. No. 6,359,725, and a continuation-in-part of application No. 09/471,747, filed on Dec. 23, 1999, now Pat. No. 6,335,820.
(60) Provisional application No. 60/089,426, filed on Jun. 16, 1999.

(51) Int. Cl.[7] .................................................. H01S 3/00
(52) U.S. Cl. ...................................................... 359/334
(58) Field of Search .......................................... 359/334

(56) References Cited

U.S. PATENT DOCUMENTS

| | | | |
|---|---|---|---|
| 4,616,898 A | 10/1986 | Hicks, Jr. .............. | 350/96.15 |
| 4,699,452 A | 10/1987 | Mollenauer et al. ..... | 350/96.16 |
| 4,932,739 A | 6/1990 | Islam ..................... | 350/96.15 |
| 4,995,690 A | 2/1991 | Islam ..................... | 350/96.15 |
| 5,020,050 A | 5/1991 | Islam ..................... | 370/4 |
| 5,078,464 A | 1/1992 | Islam ..................... | 385/122 |
| 5,101,456 A | 3/1992 | Islam ..................... | 385/27 |
| 5,115,488 A | 5/1992 | Islam et al. ............. | 385/129 |

(List continued on next page.)

FOREIGN PATENT DOCUMENTS

| | | | | |
|---|---|---|---|---|
| EP | 0 903 877 A2 | 3/1999 | .......... | H04B/10/18 |
| EP | 1 054 489 A2 | 11/2000 | | |
| EP | 1180860 A1 * | 2/2002 | .......... | H04B/10/17 |
| WO | 98/42088 A1 | 9/1998 | .......... | H04B/10/17 |
| WO | 99/66607 A2 | 12/1999 | | |
| WO | WO 99/66607 * | 12/1999 | | |
| WO | 00/49721 A2 | 8/2000 | | |

OTHER PUBLICATIONS

U.S. application # 60/310,147. "Active Gain Equalizers and Bi–Directional Raman Amplifiers". Islam et al. Filed Aug. 3, 2001.*

(List continued on next page.)

*Primary Examiner*—Thomas G. Black
*Assistant Examiner*—Deandra M. Hughes
(74) *Attorney, Agent, or Firm*—Baker Botts L.L.P.

(57) ABSTRACT

A multi-stage optical amplifier includes an optical fiber with at least a first Raman amplifier fiber and a second Raman amplifier fiber. The optical fiber is configured to be coupled to at least one signal source that produces at least a signal wavelength $\lambda_s$ and at least two pump sources that collectively produce a pump beam of wavelength $\lambda_p$. Pump wavelength $\lambda_p$ is less than signal wavelength $\lambda_s$. Signal input, signal output and a first pump input port are each coupled to the optical fiber. The first Raman amplifier fiber is positioned between the signal input port and the pump input port. The second Raman amplifier fiber is positioned between the pump input port and signal output port. A second pump input port is coupled to the optical fiber and positioned between the second Raman amplifier fiber and the signal output port. A first lossy member is positioned between the pump input port and the signal output port. The lossy member is lossy in at least one direction so that passage of the pump radiation of wavelength $\lambda_p$ from the second to the first length of amplifier fiber is substantially blocked. The signal flows in a first direction and the pump beam flows in a reverse direction relative to the first direction.

69 Claims, 20 Drawing Sheets

U.S. PATENT DOCUMENTS

| | | | |
|---|---|---|---|
| 5,224,194 A | 6/1993 | Islam | 385/122 |
| 5,369,519 A | 11/1994 | Islam | 359/173 |
| 5,485,536 A | 1/1996 | Islam | 385/31 |
| 5,559,920 A | 9/1996 | Chraplyvy et al. | 385/123 |
| 5,623,508 A | 4/1997 | Grubb et al. | 372/3 |
| 5,629,795 A | 5/1997 | Suzuki et al. | 359/337 |
| 5,664,036 A | 9/1997 | Islam | 385/31 |
| 5,673,280 A | 9/1997 | Grubb et al. | 372/3 |
| 5,778,014 A | 7/1998 | Islam | 372/6 |
| 5,790,300 A | 8/1998 | Zediker et al. | 359/334 |
| 5,796,909 A | 8/1998 | Islam | 385/147 |
| 5,815,518 A | 9/1998 | Reed et al. | 372/6 |
| 5,861,981 A | 1/1999 | Jabr | 359/341 |
| 5,887,093 A * | 3/1999 | Hansen et al. | 359/160 |
| 5,905,838 A | 5/1999 | Judy et al. | 385/123 |
| 5,959,750 A | 9/1999 | Eskildsen et al. | 359/134 |
| 5,978,130 A | 11/1999 | Fee et al. | 359/341 |
| 6,008,933 A | 12/1999 | Grubb et al. | 359/341 |
| 6,043,927 A | 3/2000 | Islam | 359/332 |
| 6,052,393 A | 4/2000 | Islam | 372/6 |
| 6,081,366 A | 6/2000 | Kidorf et al. | 359/341 |
| 6,088,152 A | 7/2000 | Berger et al. | 359/334 |
| 6,101,024 A | 8/2000 | Islam et al. | 359/334 |
| 6,151,160 A | 11/2000 | Ma et al. | 359/341 |
| 6,163,636 A | 12/2000 | Stentz et al. | 385/24 |
| 6,181,464 B1 | 1/2001 | Kidorf et al. | 359/334 |
| 6,191,854 B1 | 2/2001 | Grasso et al. | 359/124 |
| 6,191,877 B1 | 2/2001 | Chraplyvy et al. | 359/124 |
| 6,219,176 B1 | 4/2001 | Terahara | 359/341 |
| 6,236,496 B1 | 5/2001 | Yamada et al. | 359/341 |
| 6,239,902 B1 | 5/2001 | Islam et al. | 359/334 |
| 6,239,903 B1 | 5/2001 | Islam et al. | 359/337 |
| 6,263,139 B1 * | 7/2001 | Kawakami et al. | 359/161 |
| 6,310,716 B1 | 10/2001 | Evans et al. | 359/334 |
| 6,335,820 B1 | 1/2002 | Islam | 359/334 |
| 6,356,383 B1 | 3/2002 | Cornwell, Jr. et al. | 359/334 |
| 6,356,384 B1 | 3/2002 | Islam | 359/334 |
| 6,359,725 B1 | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |
| 6,404,964 B1 * | 6/2002 | Bhagavatula et al. | 372/6 |
| 6,414,786 B1 * | 7/2002 | Foursa | 359/334 |
| 6,417,959 B1 | 7/2002 | Bolshtyansky et al. | 359/334 |
| 6,437,906 B1 * | 8/2002 | Di Pasquale et al. | 359/337.2 |
| 2002/0001123 A1 | 1/2002 | Miyakawa et al. | 359/334 |

OTHER PUBLICATIONS

Rottwitt et al. "Detailed Analysis of Raman amplifiers for Long–Haul Transmission". OFC '98. 1998. pp. 30–31.*

Rottwitt et al. "Distributed Raman Amplifiers for Long Haul Transmission Systems." IEEE. 1998. pp. 251–252.*

Qian et al. Fiber Raman Amplifications with Dispersion Compensating Fibers. OSA TOPS vol. 44, pp. 36–43. 2001.*

Okuno et al. Nonlinear–fiber–based discrete Raman amplifier with sufficiently suppressed degradation of WDM signal quality. OSA TOPS vol. 44, pp. 72–74. 2001.*

Masuda et al. Ultra Wide–Band Raman Amplification with a Total Gain–Bandwidth of 132 nm of Two Gain–Bands around 1.5 micrometers. ECOC '99, Sep. 26–30, 1999. pp . II–146 to II–147.*

Sugizaki, et al., Slope Compensating DCF for S–band Raman Amplifier, OSA TOPS vol. 60, Optical Amplifiers and Their Applications, Nigel Jolley, John D. Minelly, and Yoshiaki Nakano, eds., 2001 Optical Society of America, pp. 49–53.

Vasilyev, et al., Pump intensity noise and ASE spectrum of Raman amplification in non–zero dispersion–shifted fibers, reprinted from the Optical Amplifiers and Their Applications Conference, 2001 Technical Digest, 2001 Optical Society of America, pp. 57–59.

Hansen et al., "Repeaterless transmission experiment employing dispersion", 21st European Conference on Optical Communication, vol. 2, 1 page, Sep. 17–21, 1995.

Nissov et al., "100 Gb/s (10×10Gb/s) WDM Transmission Over 7200 km Using Distributed Raman Amplification," European Conference on Optical Communications, paper PD–9, pp. 9–12, Sep. 1997.

Hansen et al.; "Loss compensation in dispersion compensating fiber modules by Raman amplification," Optical Fiber Conference OFC'98, paper TuD1, Technical Digest, San Jose, CA, pp. 20–21, Feb. 1998.

Lee et al., "Bidirectional transmission of 40 Gbit/s WDM signal over 100km dispersion shifted fibre," Electronics Letters, vol.34, No. 3, pp. 294–295, Feb. 5, 1998.

Okuno et al., "Generation of Ultra–Broad–Band Supercontinuum by Dispersion–Flattened and Decreasing Fiber," IEEE Photonics Technology Letters, vol. 10, No. 1, pp. 72–74, Jan. 1998.

Masuda et al., "Ultrawide 75–nm 3–dB Gain–Band Optical Amplification with Erbium–Doped Fluoride Fiber Amplifiers and Distributed Raman Amplifiers," IEEE Photonics Technology Letters, vol. 10, No. 4, pp. 516–518, Apr. 1998.

Emori et al., "Less than 4.7 dB Noise Figure Broadband In–Line EDFA with A Raman Amplified–1300 ps/nm DCF Pumped by Multi–channel WDM Laser Diodes," OSA Conference, paper PD3–1–5, Vail, CO, Jul. 1998.

Kawai et al., "Ultrawide, 75–nm 3–dB gain–band optical amplifier utilizing erium–doped fluoride fiber and Raman fiber," OFC Technical Digest, pp. 32–34, 1998.

Becker et al., "Erbium Doped Fiber Amplifiers Fundamentals and Technology," Academic Press, pp. 55–60, 1999.

Masuda et al., "Wide–Band and Gain–Flattened Hybrid Fiber Amplifier Consisting of an EDFA and a Multiwavelength Pumped Raman Amplifier," IEEE Photonics Technology Letters, vol. 11, No. 6, pp. 647–649, Jun. 1999.

Kawai, et al. "Wide–Bandwidth and Long–Distance WDM Transmission Using Highly Gain–Flattened Hybrid Amplifier," IEEE Photonics Technology Letters, vol. 11, No. 7, pp. 886–888, Jul. 1999.

Yun et al., "Dynamic Erbium–Doped Fiber Amplifier Based on Active Gain Flattening with Fiber Acoustooptic Tunable Filters," IEEE Photonics Technology Letters, vol. 11, No. 10, pp. 1229–1231, Oct. 1999.

Mikkelsen et al., "160 Gb/s TDM Transmission Systems," ECOC, 4 pages, 2000.

Nielsen et al., "3.28 Tb/s (82×40 Gb/s) transmission over 3×100 km nonzero–dispersion fiber using dual C– and L–band hybrid Raman/Erbium–doped inline amplifiers," OFCC 2000, pp. 1229–1231, Mar. 7–10, 2000.

Pending patent application; U.S. Ser. No. 09/811,067, entitled "Method and System for Reducing Degradation of Optical Signal to Noise Ratio", Filed Mar. 16, 2001.

Pending patent application; U.S. Ser. No. 09/811,103; entitled "System and Method for Wide Band Raman Amplification", Filed Mar. 16, 2001.

Pending patent application; U.S. Ser. No. 09/916,454; entitled "System and Method for Controlling Noise Figure", Filed Jul. 27, 2001.

Pending patent application; U.S. Ser. No. 10/100,588; entitled "Electro–Absorption Based Modulation", Filed Mar. 15, 2002.

Pending patent application, U.S. Ser. No. 09/768,367, entitled "All Band Amplifier", Filed Jan. 22, 2001.

Pending patent application; U.S. Ser. No. 09/766,489; entitled "Nonlinear Polarization Amplifiers in Nonzero Dispersion Shifted Fiber", Filed Jan. 19, 2001.

Pending patent application; U.S. Ser. No. 09/800,085; entitled "Dispersion Compensating Nonlinear Polarization Amplifier", Filed Mar. 5, 2001.

Pending patent application; U.S. Ser. No. 09/765,972; entitled "S+ Band Nonlinear Polarization Amplifiers", Filed Jan. 19, 2001.

Pending patent application; U.S. Ser. No. 10/003,199; entitled "Broadband Amplifier and Communication System", Filed Oct. 30, 2001.

Pending patent application; U.S. Ser. No. 10/005,472; entitled "Multi–Stage Optical Amplifier and Broadband Communcation System", Filed Nov. 6, 2001.

Pending patent application; U.S. Ser. No. 10/014,839; entitled "Multi–Stage Optical Amplifier and Broadband Communcation System", Filed Dec. 10, 2001.

Pending patent application; U.S. Ser. No. 09/990,142; entitled "Broadband Amplifier and Communication System", Filed Nov. 20, 2001.

* cited by examiner

FIG.—4 (Continued)

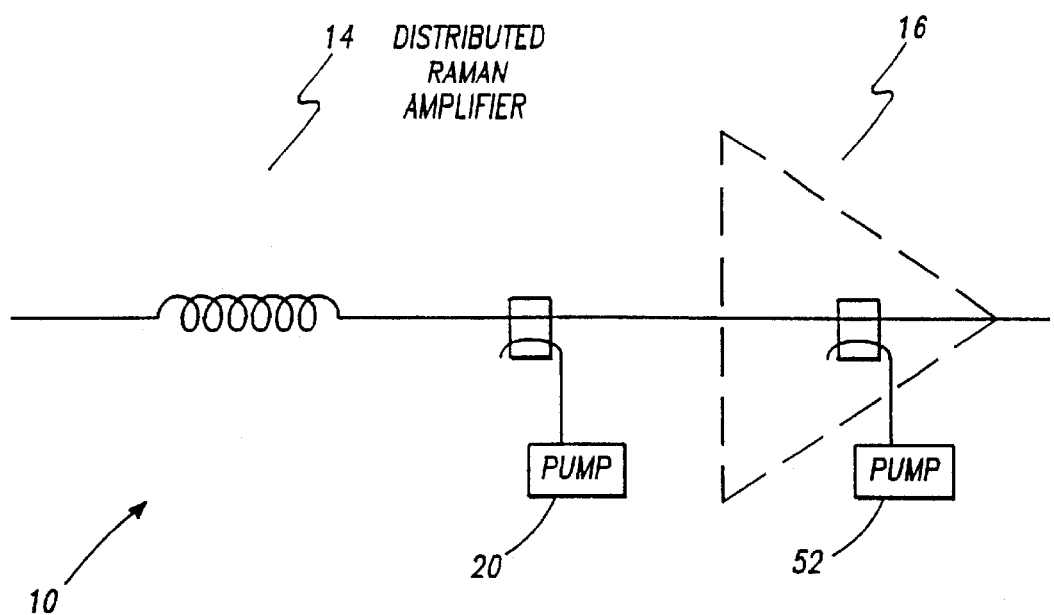
FIG.—8b
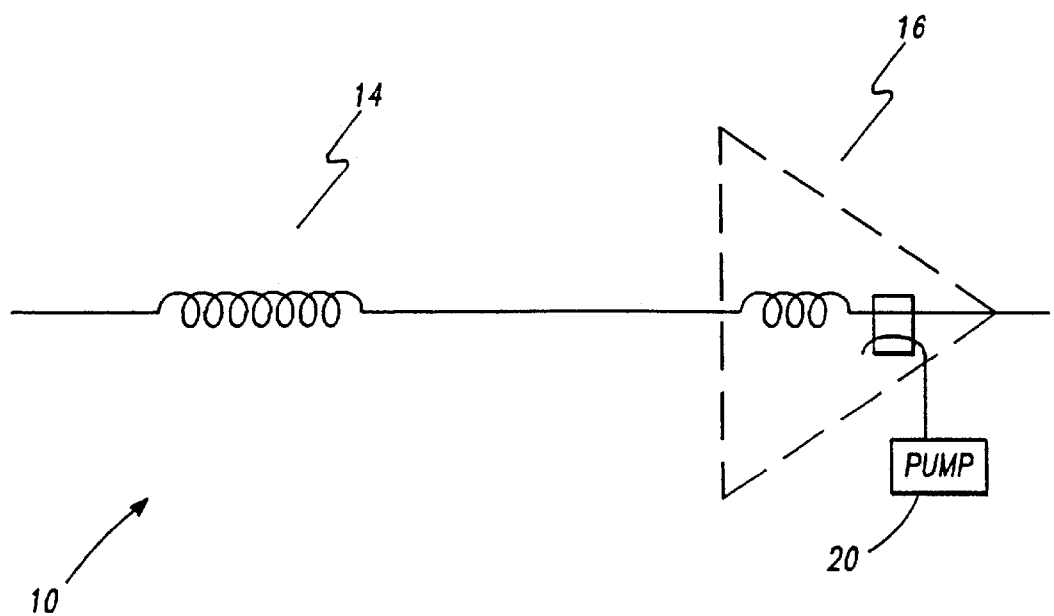
FIG.—8c

FIG.—10

MULTI-STAGE OPTICAL AMPLIFIER AND BROADBAND COMMUNICATION SYSTEM

CROSS REFERENCE TO RELATED APPLICATIONS

This application is a continuation of U.S. application Ser. No. 09/471,753, filed Dec. 23, 1999, now U.S. Pat. No. 6,359,725 which is a continuation-in-part of Provisional Application Serial No. 60/089,426, filed Jun. 16, 1999, and a continuation-in-part of application Ser. No. 09/471,747, filed Dec. 23, 1999, now U.S. Pat. No. 6,335,820.

BACKGROUND OF THE INVENTION

1. Field of the Invention

This invention relates generally to multi-stage optical amplifiers, and more particularly to broadband communication systems that include one or more multi-stage optical amplifiers.

2. Description of the Related Art

The demand for bandwidth continues to grow exponentially on fiber-optic superhighways due to applications such as data communications and the internet. Consequently, there is much effort at exploiting the bandwidth of optical fibers by using higher speeds per channel. Examples include time-division multiplexed systems-and wavelength-division multiplexing (WDM).

Most fiber-optic networks currently deployed use standard single-mode fiber or dispersion-shifted fiber (DSF). Standard fiber has a zero dispersion wavelength around 1310 nm, and the dispersion is primarily resulting from the inherent glass dispersion. Currently, most of the terrestrial network in the US and the world is based on standard fiber.

With DSF, waveguide dispersion is used to shift the zero dispersion wavelength to longer wavelengths. A conventional DSF has a zero dispersion wavelength at 1550 nm, coinciding with the minimum loss in a fused silica fiber. However, the zero dispersion wavelength can be shifted around by varying the amount of waveguide dispersion added. DSF is used exclusively in two countries, Japan and Italy, as well as in new long-haul links.

The limiting factors for a fiber-optic transmission line include loss, dispersion and gain equalization. Loss refers to the fact that the signal attenuates as it travels in a fiber due to intrinsic scattering, absorption and other extrinsic effects such as defects. Optical amplifiers can be used to compensate for the loss. Dispersion means that different frequencies of light travel at different speeds, and it comes from both the material properties and waveguiding effects. When using multi-wavelength systems and due the non-uniformity of the gain with frequency, gain equalization is required to even out the gain over the different wavelength channels.

The typical solution to overcoming these limitations is to periodically place in a transmission system elements to compensate for each of these problems. For example, a dispersion compensator can be used to cancel the dispersion, an optical amplifier used to balance the loss and a gain equalization element used to flatten the gain. Examples of dispersion compensators include chirped fiber gratings and dispersion compensating fiber (DCF). Examples of optical amplifiers include erbium-doped fiber amplifiers (EDFAs), Raman amplifiers, and non-linear fiber amplifiers (NLFAs).

Another problem that arises in WDM systems is interaction or cross-talk between channels through non-linearities in the fiber. In particular, four-wave mixing (4WM) causes exchange of energy between different wavelength channels, but 4WM only phase matches near the zero dispersion wavelength. Consequently, if a fiber link is made from conventional DSF, it is difficult to operate a WDM system from around 1540–1560 nm. This turns out to be quite unfortunate because typical EDFA's have gain from 1535–1565 nm, and the more uniform gain band is near 1540–1560 nm. A second fiber nonlinearity that can be troublesome is modulation instability (MI), which is 4WM where the fiber's nonlinear index-of-refraction helps to phase match. However, MI only phase matches when the dispersion is positive or in the so-called soliton regime. Therefore, MI can be avoided by operating at wavelengths shorter than the zero dispersion wavelength.

As the bandwidth utilization over individual fibers increases, the number of bands used for transmission increases. For WDM systems using a number of bands, additional complexities arise due to interaction between and amplification in multi-band scenarios. In particular, particular system designs are needed for Raman amplification in multi-band transmission systems. First, a new nonlinearity penalty arises from the gain tilt from the Raman effect between channels. This arises because long wavelength channels tend to rob energy from the short wavelength channels. Therefore, a means of minimizing the gain tilt on existing channels with the addition of new WDM channels is required.

To minimize both the effects of 4WM and Raman gain tilt, another technical strategy is to use distributed Raman amplification. In a WDM system with multi-bands, a complexity arises from interaction between the different pumps along the transmission line.

There is a need for greater bandwidth for broadband communication systems. A further need exists for broadband communication systems with reduced loss. Yet another need exists for broadband communication systems in the short wavelength region (S-band) covering the wavelength range of approximately 1430–1530 nm. Another need exists for broadband communication systems with improved dispersion compensation.

SUMMARY OF THE INVENTION

Accordingly, it is an object of the present invention to provide improved multi-stage optical amplifiers and broadband communication systems.

Another object of the present invention is to provide multi-stage optical amplifiers and broadband communication systems with greater bandwidth.

Yet another object of the present invention is to provide multi-stage optical amplifiers and broadband communication systems in the S band.

A further object of the present invention is to provide multi-stage optical amplifiers and broadband communication systems that use standard fiber and DSF with different zero dispersion wavelengths.

Another object of the present invention is to provide a multi-stage optical amplifier and broadband communication system that combines the C and S bands.

Yet another object of the present invention is to provide multi-stage optical amplifiers and broadband communication systems that combine the C, S and L bands.

A further object of the present invention is to provide multi-stage optical amplifiers and broadband communication systems with gain tilt control.

It is yet another object of the present invention to provide WDM systems over DSF links by using the "violet" band in Raman amplifiers with dispersion compensating fiber to avoid nonlinearity limitations from 4WM and MI.

These and other objects of the present invention are achieved in a multi-stage optical amplifier that has an optical fiber. The optical fiber includes at least a first Raman amplifier fiber and a second Raman amplifier fiber. The optical fiber is configured to be coupled to at least one signal source that produces at least a signal wavelength $\lambda_s$ and at least two pump sources that collectively produce a pump beam of wavelength $\lambda_p$. Pump wavelength $\lambda_p$ is less than signal wavelength $\lambda_s$. Signal input, signal output and a first pump input port are each coupled to the optical fiber. The first Raman amplifier fiber is positioned between the signal input port and the pump input port. The second Raman amplifier fiber is positioned between the pump input port and signal output port. A second pump input port is coupled to the optical fiber and positioned between the second Raman amplifier fiber and the signal output port. A first lossy member is positioned between the pump input port and the signal output port. The lossy member is lossy in at least one direction so that passage of the pump radiation of wavelength $\lambda_p$ from the second to the first length of amplifier fiber is substantially blocked. The signal flows in a first direction and the pump beam flows in a reverse direction relative to the first direction.

In another embodiment, the present invention is a broadband communication system with a transmitter and a receiver. An optical fiber is coupled to the transmitter and receiver. The optical fiber includes at least a first Raman amplifier fiber and a second Raman amplifier fiber. The optical fiber is configured to be coupled to at least one signal source that produces at least a signal wavelength $\lambda_s$ and at least two pump sources that collectively produce a pump beam of wavelength $\lambda_p$. Pump wavelength $\lambda_p$ is less than signal wavelength $\lambda_s$. Signal input, signal output and a first pump input port are each coupled to the optical fiber. The first Raman amplifier fiber is positioned between the signal input port and the pump input port. The second Raman amplifier fiber is positioned between the pump input port and signal output port. A second pump input port is coupled to the optical fiber and positioned between the second Raman amplifier fiber and the signal output port. A first lossy member is positioned between the pump input port and the signal output port. The lossy member is lossy in at least one direction so that passage of the pump radiation of wavelength $\lambda_p$ from the second to the first length of amplifier fiber is substantially blocked.

DETAILED DESCRIPTION OF PREFERRED EMBODIMENTS

Figure 1:
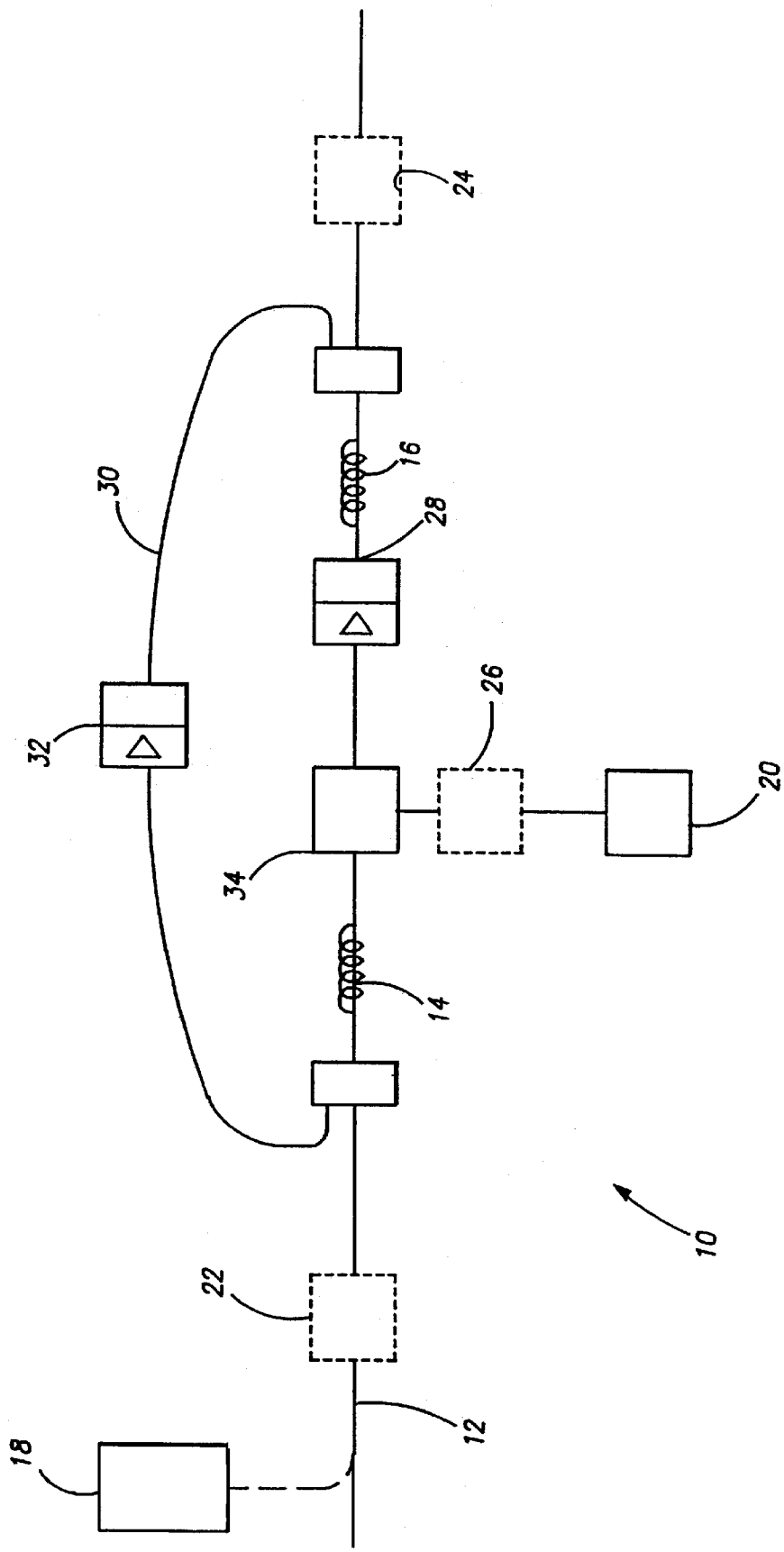
FIG. 1 is a schematic diagram of one embodiment of a multi-stage optical amplifier of the present invention that includes a pump shunt.

One embodiment of the present invention, as illustrated in FIG. 1, is a multi-stage optical amplifier 10 with an optical fiber 12 including a first length of amplifier fiber 14 and a second length of amplifier fiber 16. Optical fiber 12 is configured to be coupled to a signal source 18 that produces at least a signal wavelength $\lambda_s$ and a pump source 20 that produces a pump wavelength $\lambda_p$. Pump wavelength $\lambda_p$ is less than signal wavelength $\lambda_s$. Signal input port 22, signal output port 24 and pump input port 26 are each coupled to optical fiber 12. A first lossy member 28 is coupled to optical fiber 12 and positioned between the first and second lengths of amplifier fiber 14 and 16 respectively. A pump shunt 30 is coupled to signal input port 22 and signal output port 24. Optionally, a second lossy member 32 is coupled to pump shunt 30. Pump shunt 30 can be an optical fiber that is integral with optical fiber 12 or a separate optical fiber.

Pump beam $\lambda_p$ propagates towards signal input port 22 from first length of amplifier fiber 14 and away from signal input port 22 to second length of amplifier fiber 16.

First and second lengths of amplifier fiber 14 and 16 each preferably have a length greater than or equal to 200 m. Pump wavelength $\lambda_p$ is preferably in the range of 1300 nm to 1530 nm, and the signal wavelength can be in the range of 1430 to 1530 nm. Suitable pump sources 20 include but are not limited to laser diodes (LD's), solid state lasers, fiber-based cascaded Raman wavelength shifters, cladding pumped fiber lasers and the like.

First lossy member 28 can be an optical isolator, an add/drop multiplexer, a gain equalization member, a dispersion compensation element and the like. One or both of first and second lengths of amplifier fiber 14 and 16 can be Raman amplifiers. Lossy elements 28 can also be placed before and after first and second lengths of amplifier fiber 14 and 16 to prevent disturbance of amplifier performance from spurious reflections from the transmission line. Additionally, a second lossy element 32 can be inserted into pump shunt 30 to reduce the multi-path interference of the signal beam in amplifiers 12 and 14.

Additionally, one or both of first and second lengths of amplifier fiber 14 and 16 can be implemented in dispersion compensating fiber (DCF). A DCF is a fiber whose zero dispersion point is shifted to wavelengths much longer than 1500 nm using the waveguide dispersion property. Consequently, DCF tend to have a small affective core area and significant germanium doping in the core, both of which lead to an enhancement of the Raman gain coefficient. DCF's are generally added periodically to a high-speed transmission link to compensate for the dispersion accumulated in the line.

In one embodiment, multi-stage optical amplifier 10 operates in a violet band between 1430 and 1530 nm. Fiber 12 is a DSF with at least one fiber non-linearity effect and a zero dispersion wavelength. In this embodiment, multi-stage optical amplifier 10 provides gain in the violet band sufficiently far from the zero dispersion wavelength to avoid non-linearity effects.

First length of amplifier fiber 14 preferably has lower noise than second length of amplifier fiber 16. Second length of amplifier fiber 16 has a higher gain than first length of amplifier fiber 14. In one embodiment, first length of amplifier fiber 14 has an optical noise figure of less than 8 dB, and second length of amplifier fiber 16 has a gain level of at least 5 dB.

One or more WDM couplers 34 are used to couple a pump path from the signal input port 22 to the signal output port 24. WDM couplers 34 are designed to pass (couple over) the signal band while coupling over (passing) the pump beams. Exemplary WDM couplers 34 include fused-tapered fiber couplers, Mach-Zehnder couplers, thin-film dielectric filters, bulk diachronic elements and the like.

Signal input port 22 inputs signal $\lambda_s$ which is amplified through Raman scattering when first and second lengths of amplifier fiber 14 and 16 are Raman amplifiers. The dispersion and length of the first and second lengths of amplifier fiber 14 and 16 can be selected to be of the same magnitude of dispersion-length product as the transmission link but of the opposite sign of dispersion. First and second lengths of amplifier fiber 14 and 16 are preferably made single spatial mode for pump source 20 and signal wavelengths by making the cut-off wavelength of the gain fiber shorter than the pump wavelength. In particular, the cut-off wavelength is the wavelength below which first and second lengths of amplifier fiber 14 and 16 support more than one mode or becomes multi-mode. If the pump or signal falls into the multi-mode region, then additional noise arising from the beating between different modes may arise.

Figure 2:
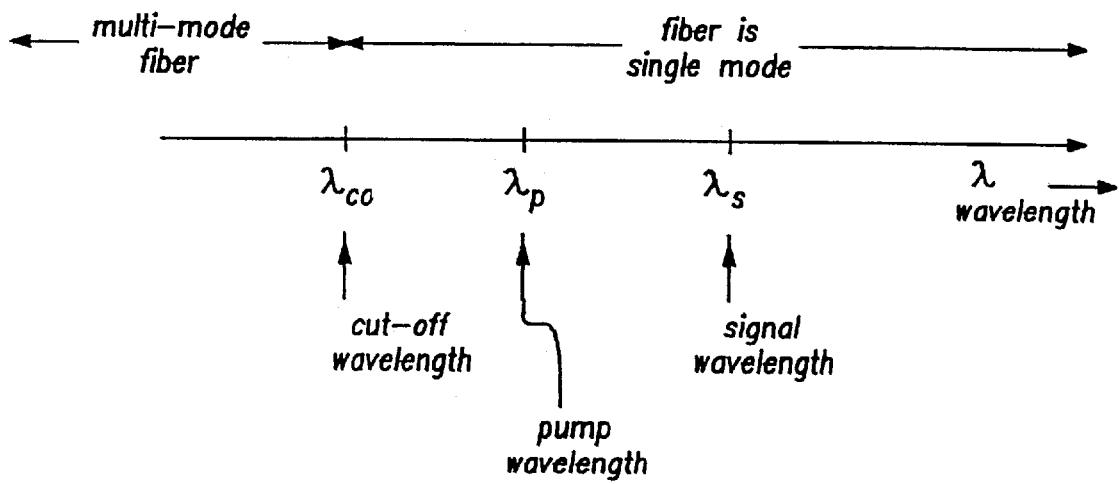
FIG. 2 illustrates that the cutoff wavelength of the fiber used with the present invention should be shorter than the pump and signal wavelengths.

As shown in FIG. 2 the fiber cut-off wavelength should be shorter than the pump wavelength $\lambda_p$. Pump wavelength $\lambda_p$ is shorter than signal wavelength $\lambda_s$. Multi-stage optical amplifier 10 is pumped so the net gain equals or exceeds the sum of losses in the transmission link and first and second lengths of amplifier fiber 14 and 16.

Figure 3:
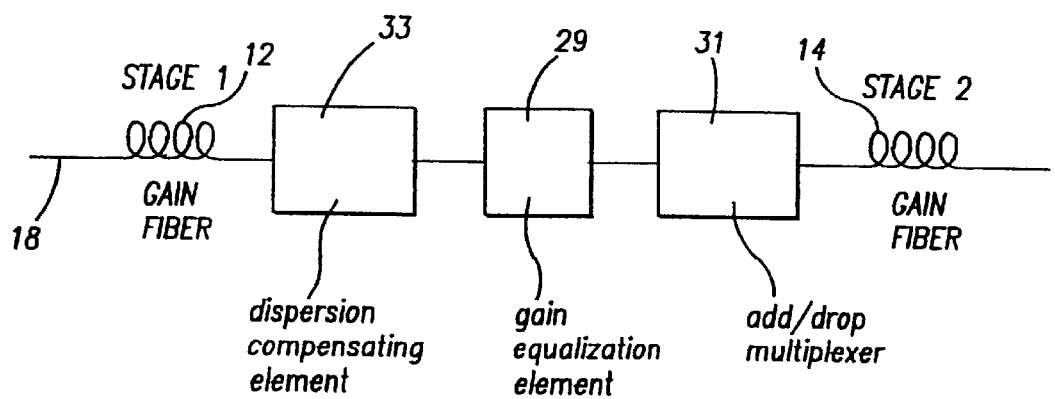
FIG. 3 is a schematic diagram illustrating the inclusion of a dispersion compensating element, a gain equalization element and an add/drop multiplexer to the multi-stage optical amplifier of the present invention.

FIG. 3 illustrates that a dispersion compensating element 33, gain equalization element 29 or an add/drop multiplexer 31 can be included and positioned between first and second lengths of amplifier fiber 14 and 16.

Figure 4:
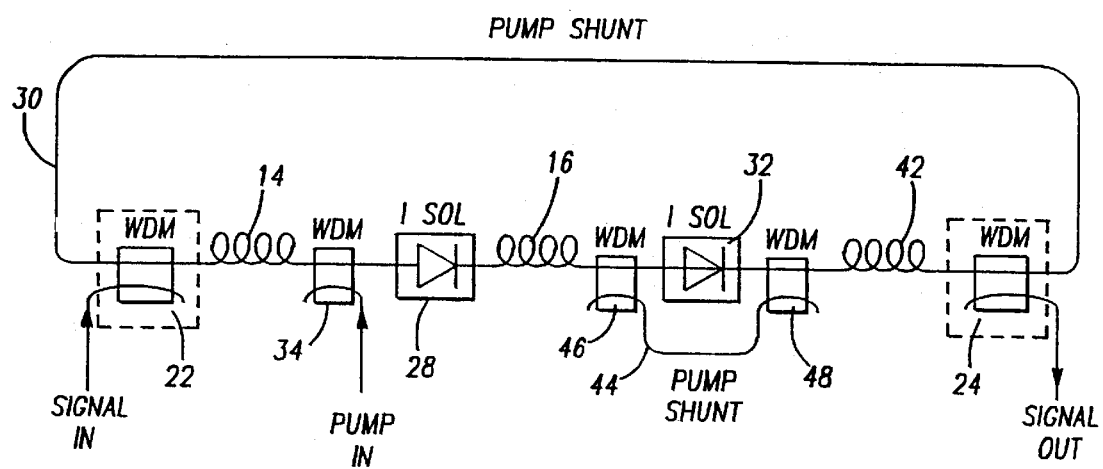
FIG. 4 is a schematic diagram of another embodiment of a multi-stage optical amplifier of the present invention that includes two pump shunts.

FIG. 4 illustrates an embodiment of multi-stage optical amplifier 10 with a third length of amplifier fiber 42. Second lossy member 32 is positioned between second and third lengths of amplifier fiber 16 and 42. A second pump shunt is coupled to second and third WDM couplers 46 and 48. Additional lengths of amplifier fiber can also be included.

Figure 5:
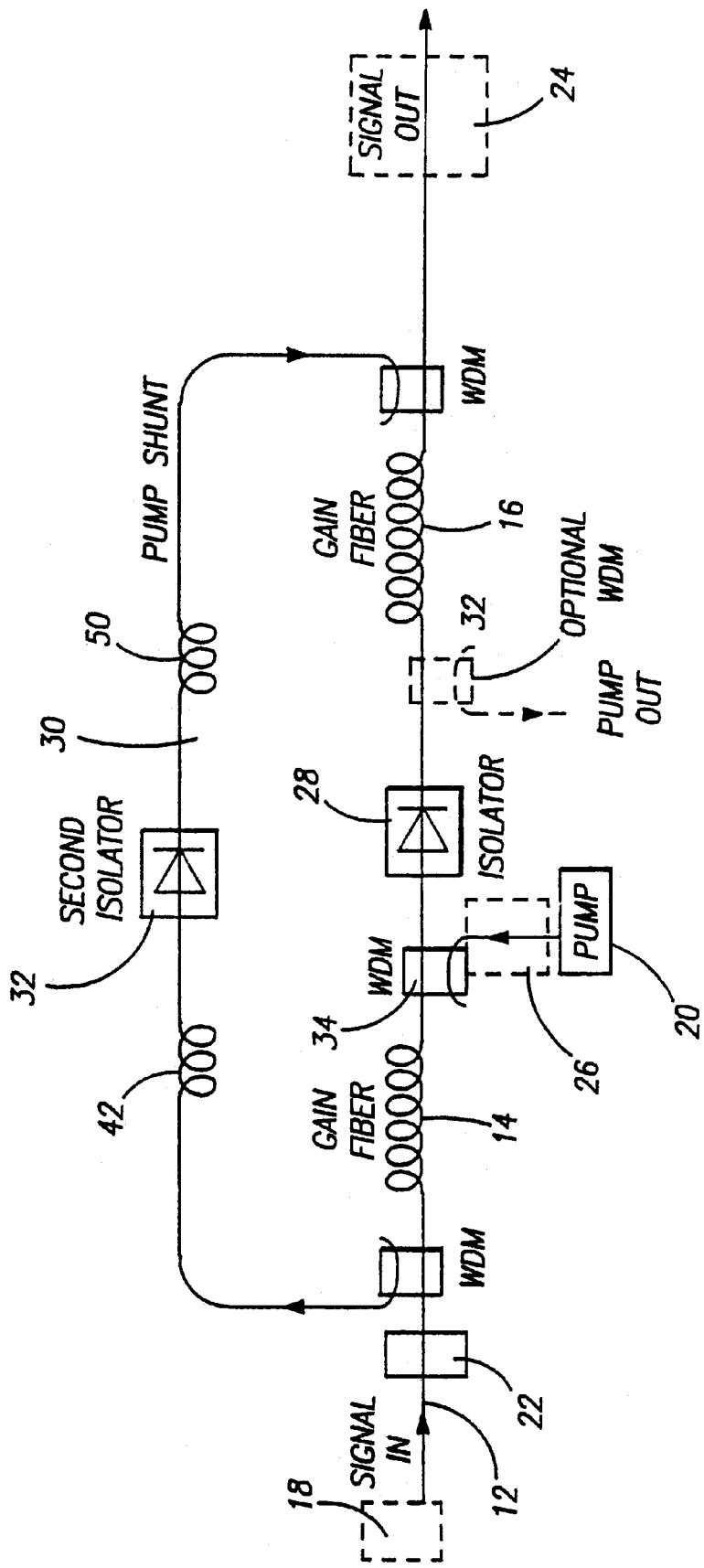
FIG. 5 is a schematic diagram of another embodiment of a multi-stage optical amplifier of the present invention that includes a pump shunt and four lengths of amplifier fiber.

As illustrated in FIG. 5, multi-stage optical amplifier 10 can include a third and a fourth length of amplifier fiber 42 and 50, respectively. In this embodiment, third and fourth lengths of amplifier fiber 42 and 50 are coupled to pump shunt 30. Second lossy member 32 is positioned between third and fourth lengths of amplifier fiber 42 and 50.

Figure 6:
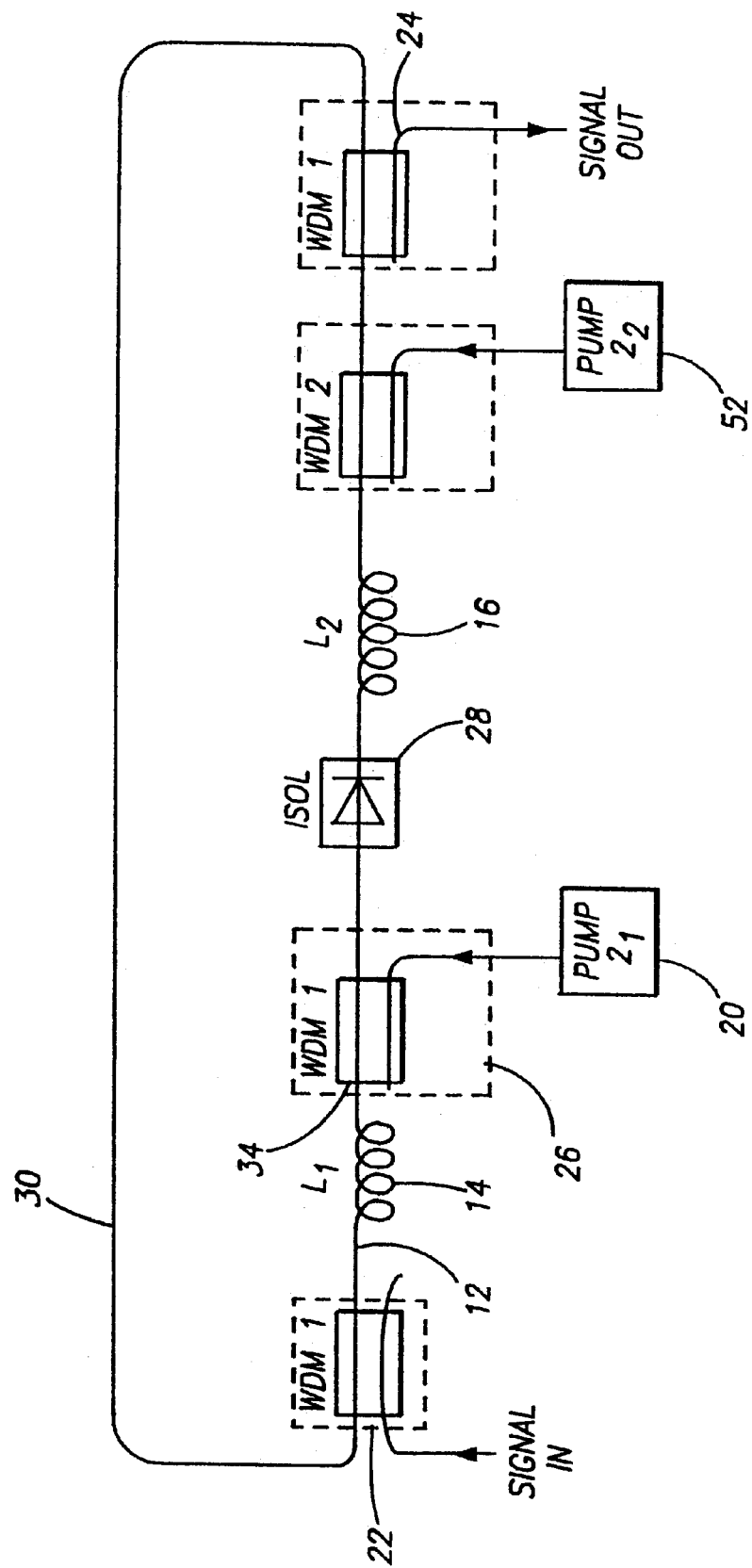
FIG. 6 is a schematic diagram of one embodiment of a multi-stage optical amplifier of the present invention that includes a pump shunt and two pump sources.

In another embodiment of multi-stage optical amplifier 10, multiple pump sources are utilized. In FIG. 6, pump source 20 is positioned between first length of amplifier fiber 14 and first lossy member 28. A second pump source 52 is positioned between second length of amplifier fiber 16 and signal output port 24 and is coupled to a second pump input port 54. First pump source 20 produces a pump beam of wavelength $\lambda_{p1}$ and second pump source 52 produces 52 a pump beam of wavelength $\lambda_{p2}$. Wavelength $\lambda_{p1}$ and wavelength $\lambda_{p2}$ can be the same or different. Pump sources 20 and 44 collectively produce a pump beam of wavelength $\lambda_p$. Pump wavelength $\lambda_p$ is less than a signal wavelength $\lambda_s$.

Figure 7:
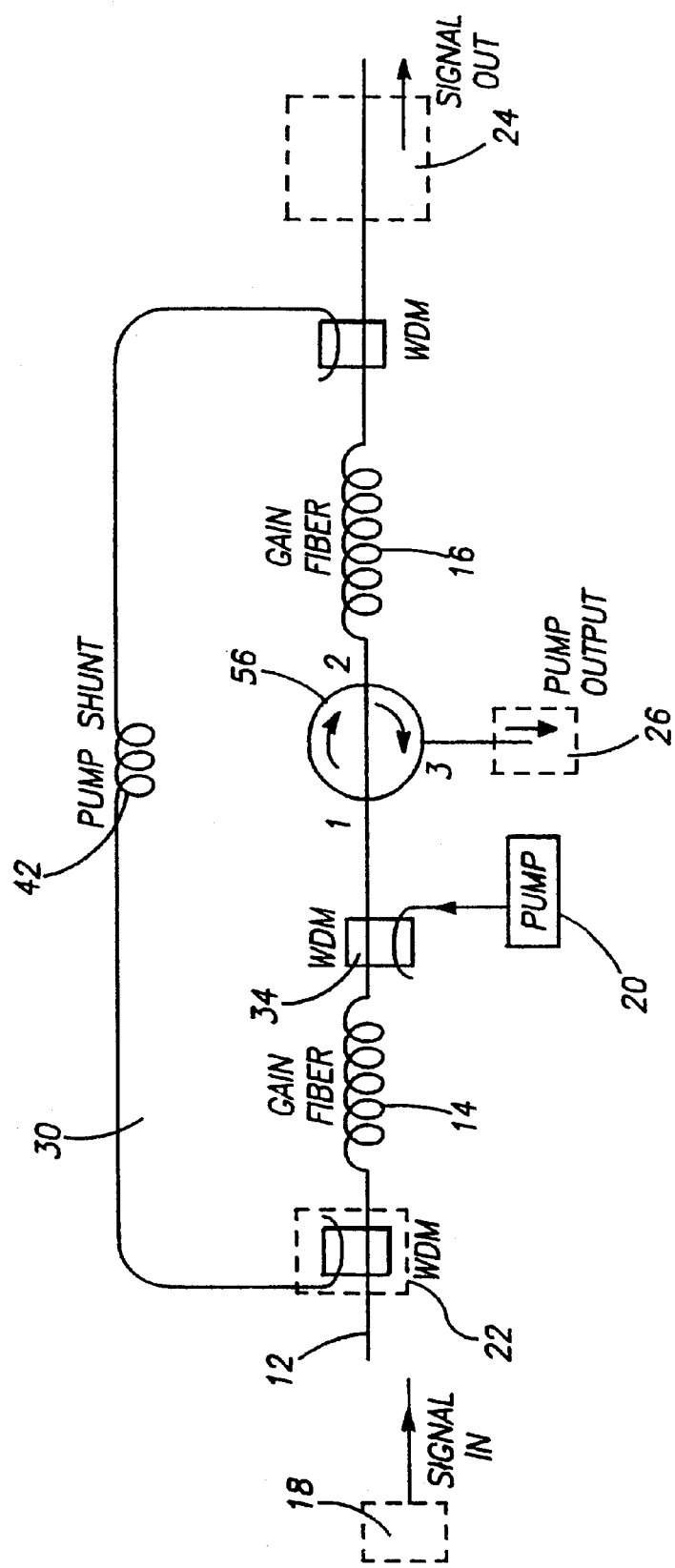
FIG. 7 is a schematic diagram of one embodiment of a multi-stage optical amplifier of the present invention that includes a pump shunt and a circulator.

In another embodiment, illustrated in FIG. 7, multi-stage amplifier 10 includes one or more circulators 56 to provide isolation between the first and second lengths of amplifier fiber 14 and 16. Circulator 56 also is useful as a means of dumping the remaining pump which can be reused elsewhere for monitoring purposes.

Figure 8:
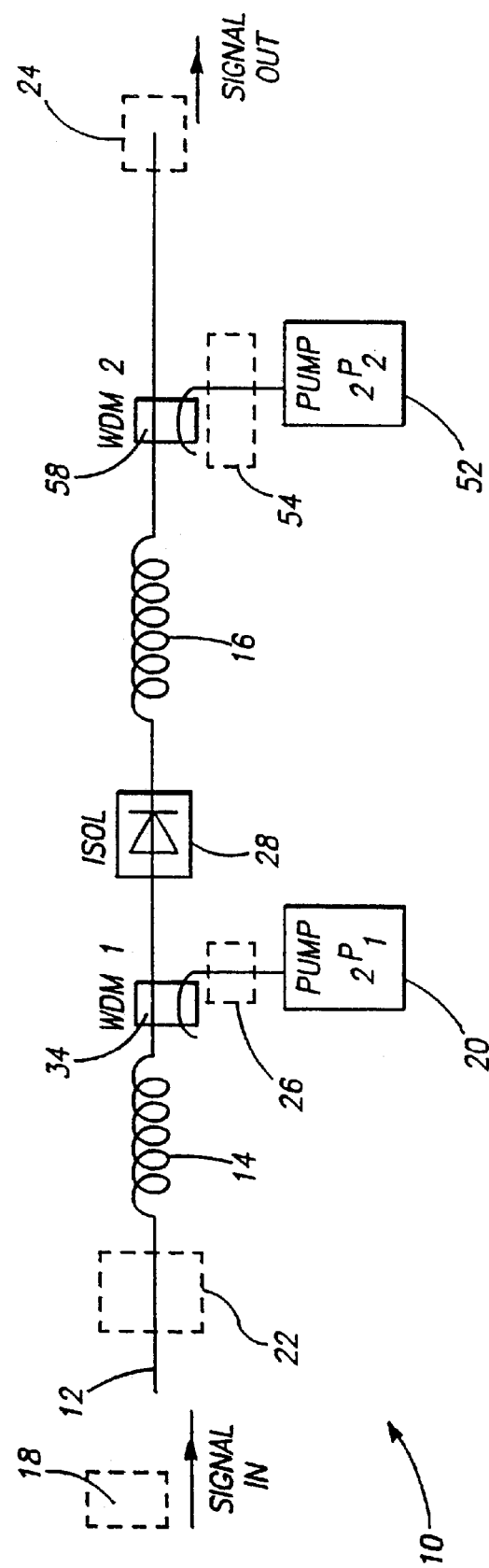
FIG. 8(a) is a schematic diagram of another embodiment of a multi-stage optical amplifier of the present invention that includes two lengths of Raman amplifier fiber and two pump sources.
FIG. 8(b) is a schematic diagram of an embodiment of the present invention with a discrete and a distributed amplifier; where distributed amplification is added with only counter-propagating Raman pumps.
FIG. 8(c) is a schematic diagram of an embodiment of the present invention similar to FIG. 8(b) in which mid-span access is not available but bi-directional pumping is allowed.

As illustrated in FIG. 8(a), multi-stage optical amplifier 10 can have an open loop configuration, In this embodiment, optical fiber 12 is pumped by a pump beam generated by pump sources 20 and 52 and first and second lengths of amplifier fiber 14 and 16 are each Raman amplifiers. Optical fiber 12 is preferably single spatial mode at both the signal and pump wavelengths. Again, wavelength $\lambda_{p1}$ and wavelength $\lambda_{p2}$ can be the same or different. The pump beam has a wavelength shorter than the signal wavelengths. Pump sources 20 and 52 collectively produce a pump beam of wavelength $\lambda_p$. An amplified signal is then output through signal output port 24. Pump sources 20 and 52 are coupled in through WDM couplers 34 and 58 which transmit signal wavelength $\lambda_s$ but couple over the pump wavelength $\lambda_p$. First lossy member 28 is positioned between pump input port 26 and signal output port 24. In this embodiment, the signal flows in a first direction and the pump beam flows in a reverse direction relative to the first direction. First and second lengths of amplifier fiber 14 and 16 are pumped in a counter-propagating manner. It may also be desirous to have bi-directional pumping in second length of amplifier fiber 16 to increase the power amplifier gain without severely impacting the noise figure of multi-stage optical amplifier 10. Other elements, including but not limited dispersion compensating element 33, gain equalization element and add/drop multiplexer 31 may be included and positioned between first and second lengths of amplifier fiber 14 and 16.

In another embodiment, illustrated in FIGS. 8(b)–8(c), first length of amplifier fiber 14 is a distributed Raman amplifier fiber and second length of amplifier fiber 16 is a discrete Raman amplifier fiber. A distributed Raman amplifier fiber is an amplifier where at least some part of the transmission link is pumped and involved in amplification. In this embodiment, first lossy member 28 is not positioned between first and second lengths of amplifier fiber 14 and 16. In FIG. 8(b) distributed amplification is added with only counter-propagating Raman pumps. When access at a mid-point stage exists alternate band pumps are added at different spatial points to minimize nonlinear interaction between pumps. In FIG. 8(c) mid-span access is not available but bi-directional pumping is allowed. The embodiment of FIG. 8(c) can be used where alternate band Raman pumps are launched in different directions in order to minimize interaction between pumps.

Figure 9:
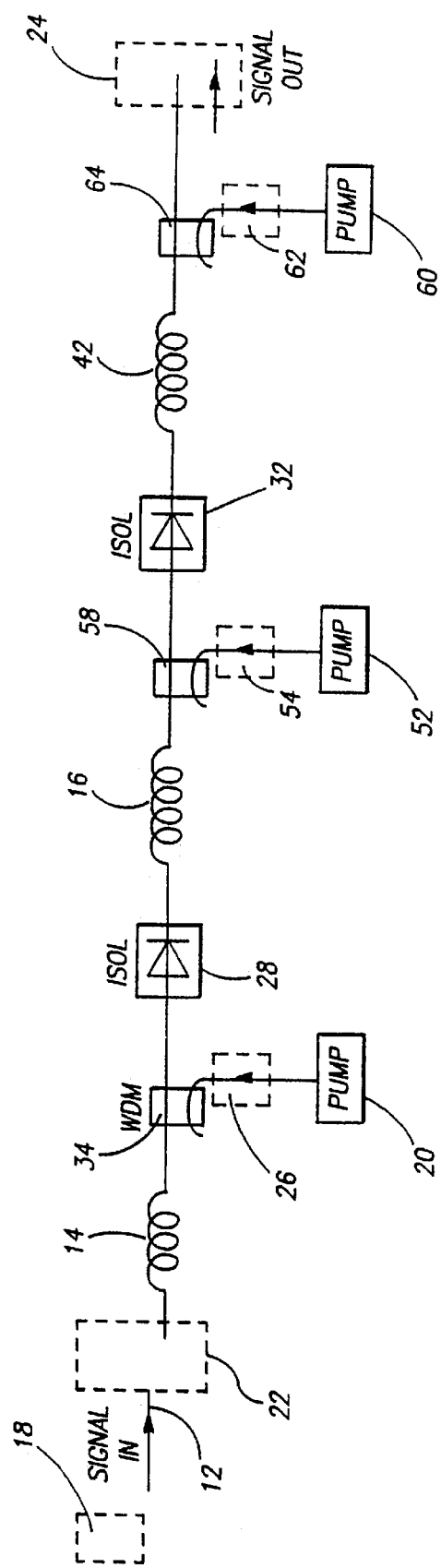
FIG. 9 is a schematic diagram of another embodiment of a multi-stage optical amplifier of the present invention that includes three lengths of Raman amplifier fiber and three pump sources.

The open loop embodiment of multi-stage optical amplifier 10 can have three or more lengths of amplifier fiber. Referring now to FIG. 9, an embodiment of multi-stage optical amplifier 10 is illustrated with third length of amplifier fiber 42 coupled to a third pump source 60 which is turn is coupled to a third pump input port 62. WDM coupler 64 is coupled to third pump input port 62. Some or all of first, second and third pump sources 20, 52 and 60 can be laser diode sources. Pump source 60 produces a pump beam of wavelength $\lambda_{p3}$. Wavelengths $\lambda_{p1}$, $\lambda_{p2}$ and $\lambda_{p3}$ can be the same or different. Pump sources 20, 44 and 60 collectively produce pump beam of wavelength $\lambda_p$. An amplified signal is then output through signal output port 24.

Figure 10:
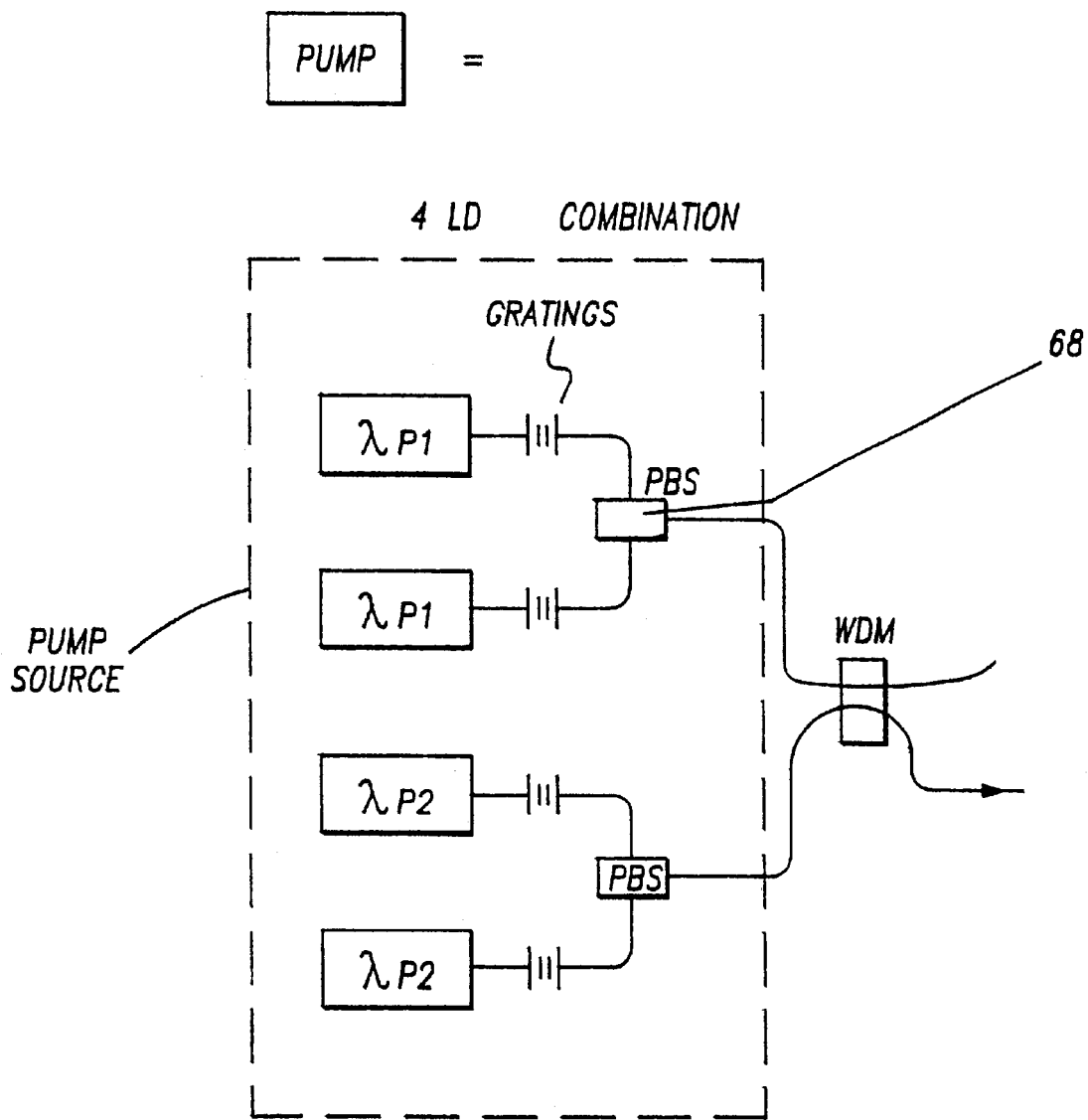
FIG. 10 is a schematic diagram illustrating four pump source whose outputs are combined using wavelength and polarization multiplexing.
Figure 11:
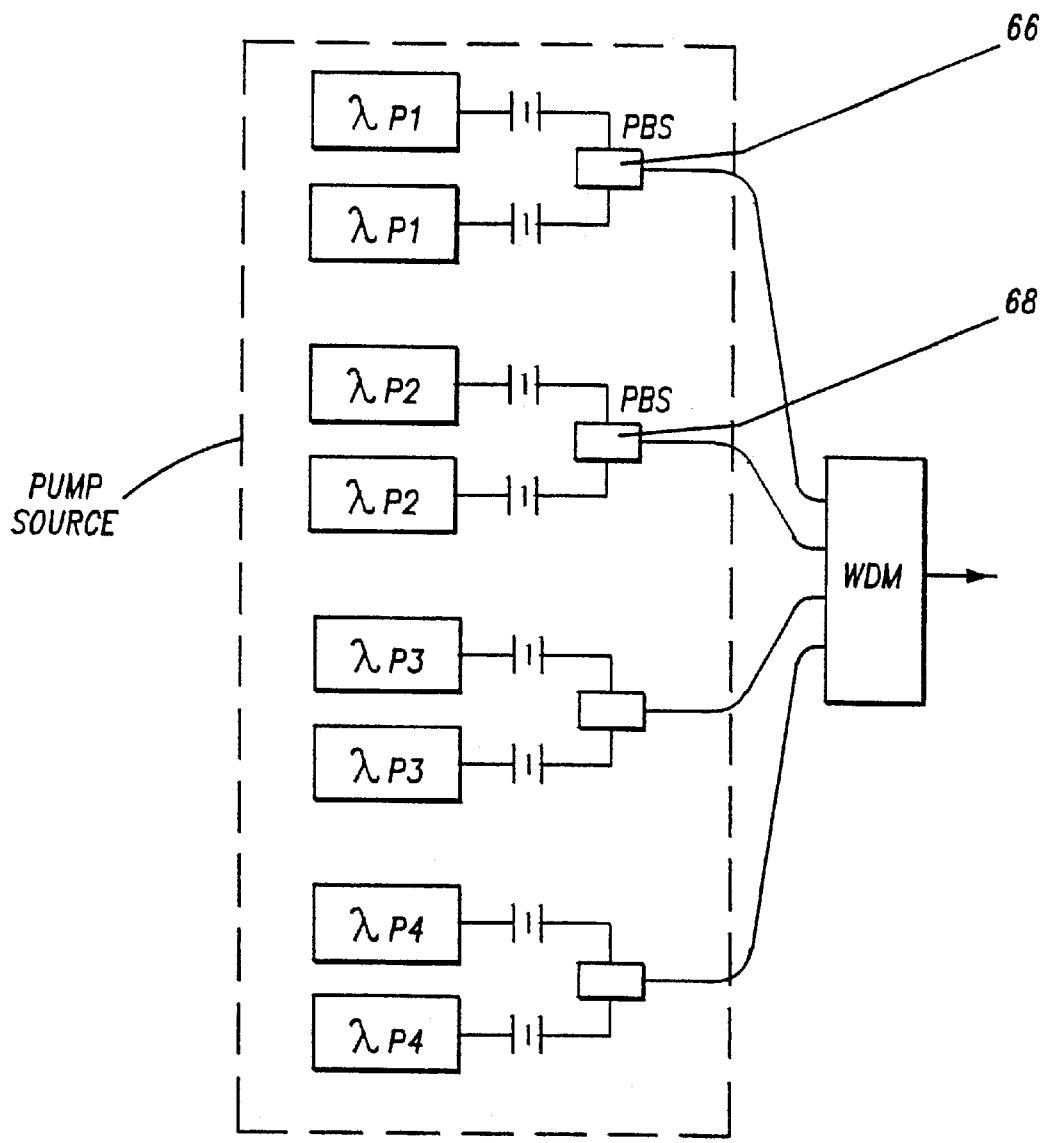
FIG. 11 is a schematic diagram illustrating eight pump source whose outputs are combined using wavelength and polarization multiplexing.

As illustrated in FIGS. 10 and 11 each of pump source 20, 52 and 60 can include multiple pump sources whose outputs can be combined using wavelength and polarization multi-plexing. Multiple combination gratings 66 and PBS's 68 can be utilized. Additionally, some or all of the multiple pump sources which comprise pump sources 20, 52 and 60 can be laser diodes.

Figure 12:
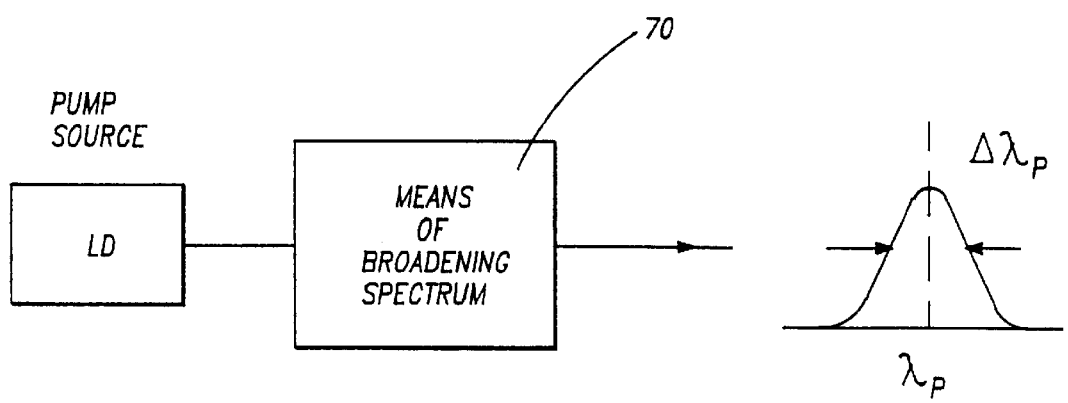
FIG. 12 is a schematic diagram illustrating that Brillouin threshold for a laser diode pump source can be minimized with the inclusion of a spectrum broadening device.

Referring now to FIG. 12, a spectrum broadening device 70 can be coupled to each pump source 20, 52 and 60. This is particularly useful for laser diode pump sources. Spectrum broadening device 70 broadens the spectrum while minimizing Brillouin threshold. Suitable spectrum broadening devices 70 include but are not limited to, (i) a grating that is sufficiently broadband that can be chirped and cascade individual wavelengths, (ii) positioning a grating in a laser diode external cavity to cause appropriate line broadening and (iii) a dithering drive. Additionally pump pulsing can be used to broaden the spectrum.

Figure 13:
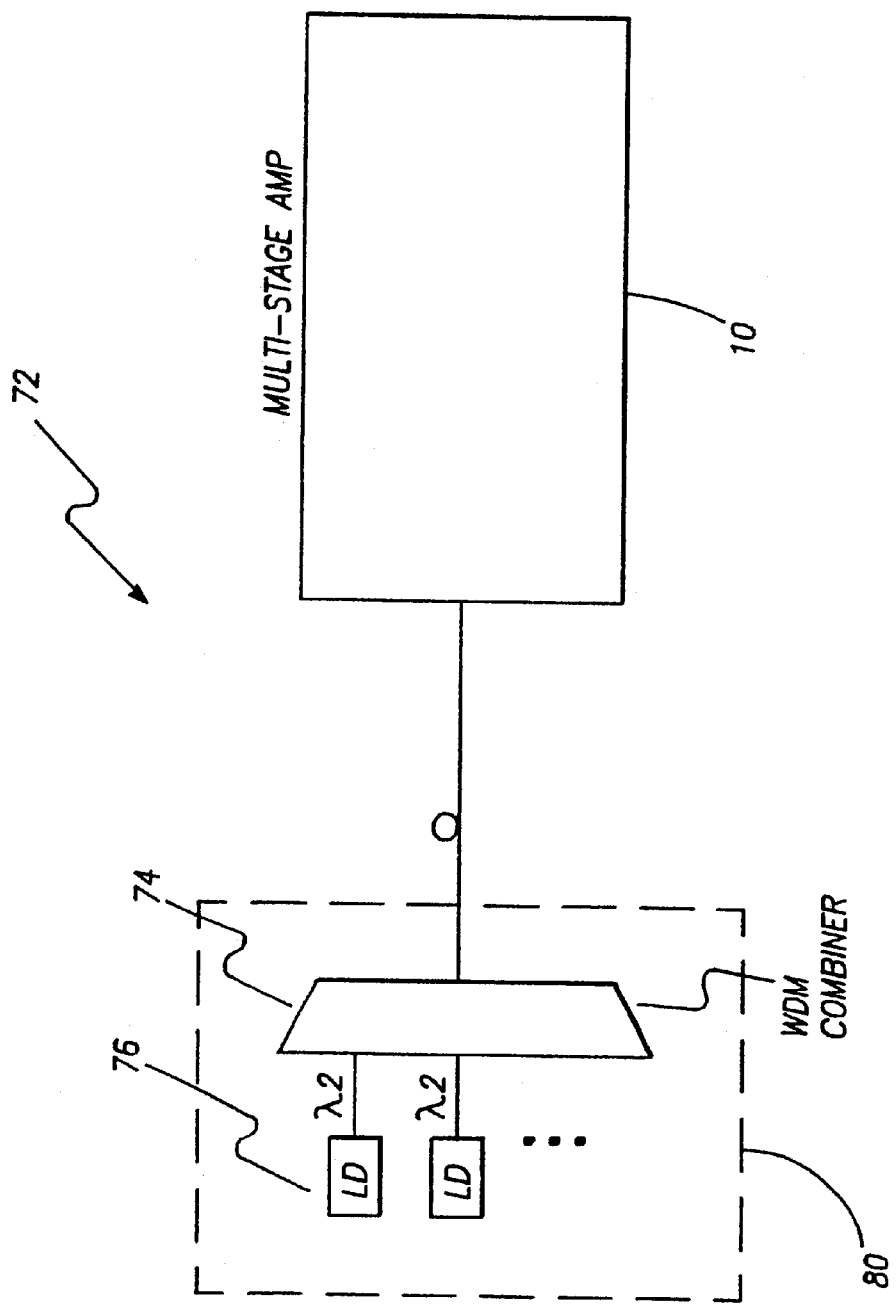
FIG. 13 is a schematic diagram of a broadband booster amplifier embodiment of the present invention.

The Brillouin threshold is reached when the following condition is satisfied:

$$\tilde{g}_B = P_0^{LD} \cdot L_{eff}/A_{eff} \leq 18$$

where $P_0^{LD}$ = power of laser diode
$L_{eff} = 1/\alpha \cdot [1-\exp^{-\alpha L}]$ effective pumping length
$A_{eff}$ = effective area of fiber 12
$\tilde{g}_B = \Delta\gamma_B/\Delta\gamma_B + \Delta\gamma_P \cdot g_B$
$\tilde{g}_B = \Delta\gamma_B/\Delta\gamma_B + \Delta\gamma_P \cdot g_B$ Multi-stage optical amplifier 10 can be an in-line broadband amplifier, a booster amplifier, a broadband pre-amplifier and incorporated in any variety of different broadband communication systems. In another embodiment, illustrated in FIG. 13, the present invention is a broadband booster amplifier 72 that includes a multi-stage optical amplifier 10 coupled to a transmitter 73. Transmitter 73 can include a WDM combiner 74 and a plurality of transmitters 76. The plurality of transmitters 76 transmit a plurality of wavelengths. The plurality of wavelengths may include at least a first band of wavelengths and a second band of wavelengths. With the present invention, a variety of different transmitters 76 can be utilized including but not limited to laser diodes, tunable lasers, or broadband sources such as continuum sources or light-emitting diodes.

Figure 14:
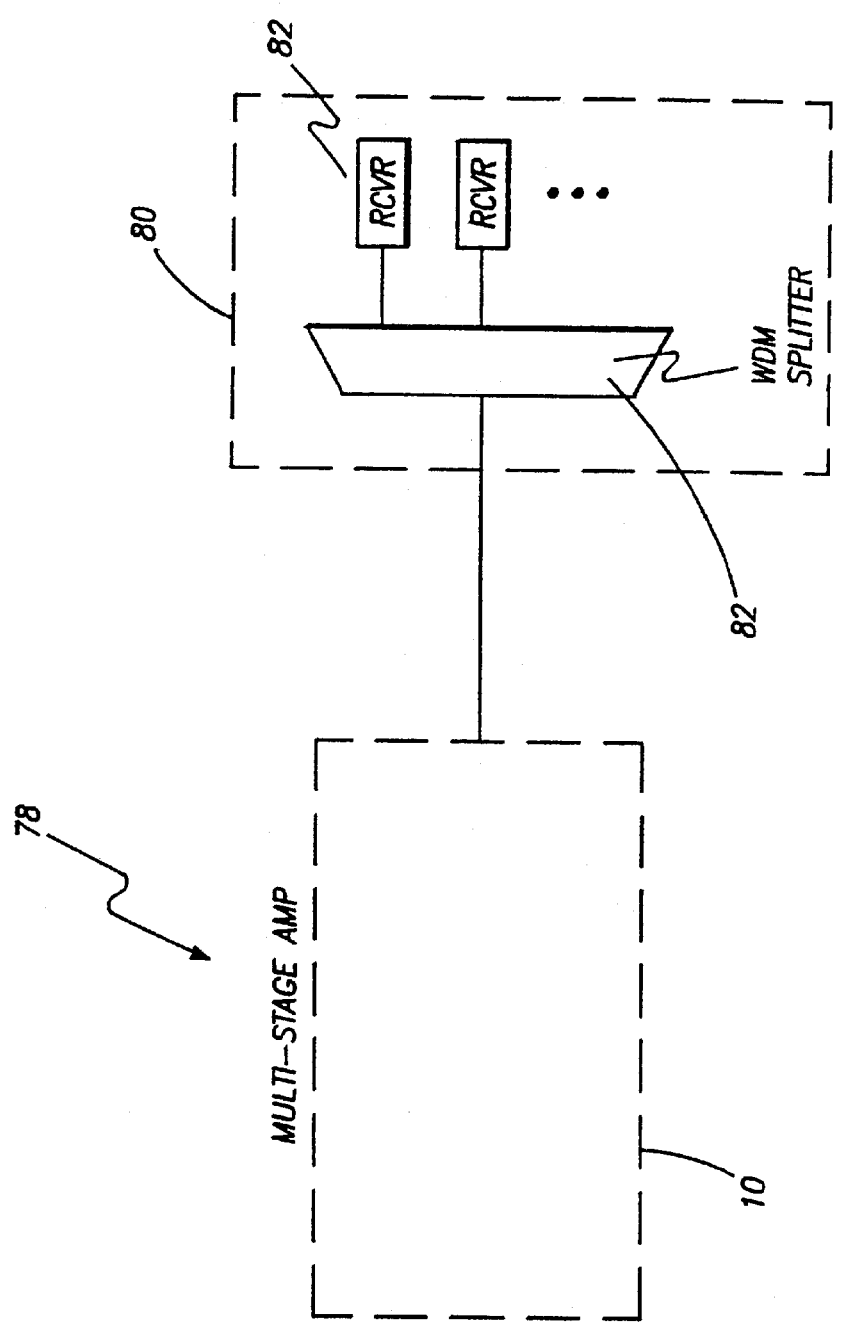
FIG. 14 is a schematic diagram of a broadband pre-amplifier embodiment of the present invention.

FIG. 14 illustrates a broadband pre-amplifier embodiment of the present invention. Broadband pre-amplifier 78 includes multi-stage optical amplifier 10 coupled to a receiver 80. Receiver 80 can include a WDM splitter 82 coupled to a plurality of receivers 84. Suitable receivers 84 include but are not limited to germanium or InGaAs or InGaAsP detectors followed by electronics well known to those skilled in the art.

Figure 15:
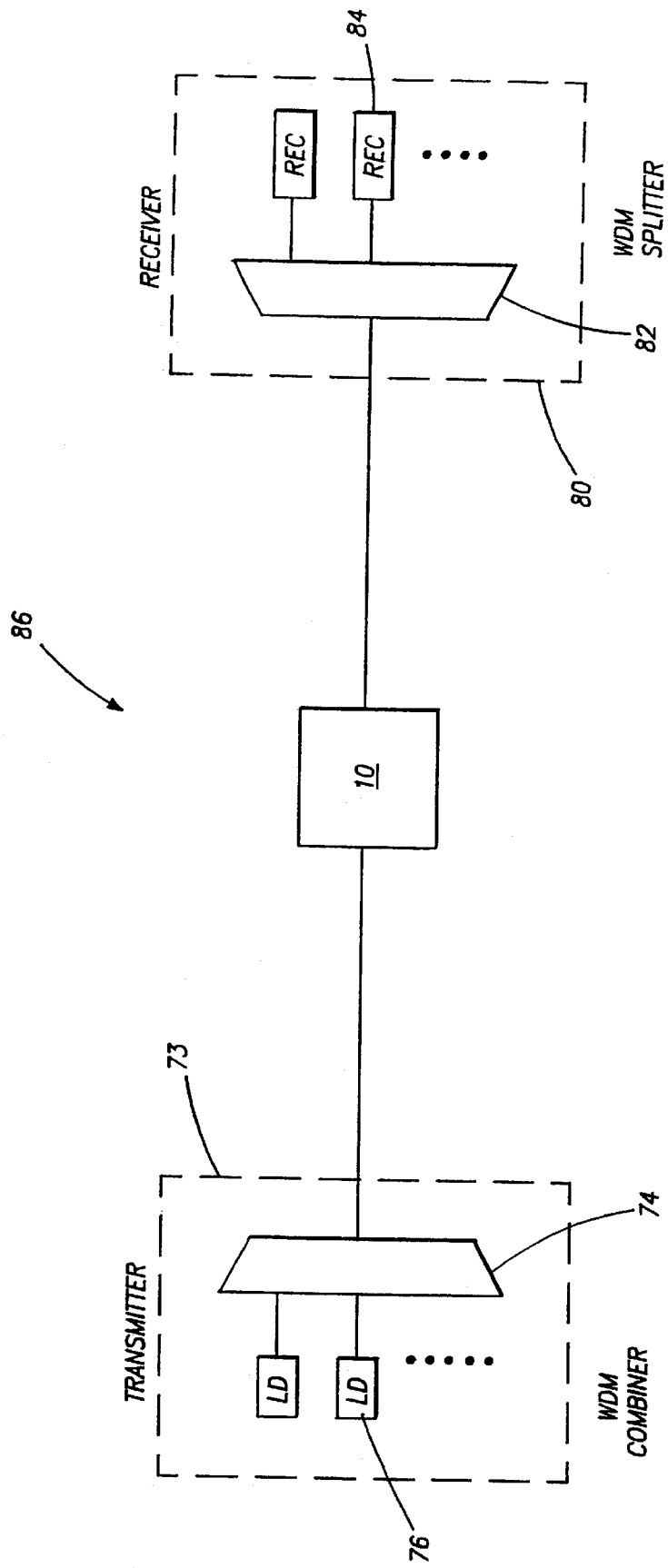
FIG. 15 is a schematic diagram of one embodiment of a broadband communication system of the present invention.

In another embodiment, illustrated in FIG. 15, the present invention is a broadband communication system 86. In this embodiment, multi-stage optical amplifier 10 is an in-line broadband amplifier. Multi-stage optical amplifier 10 is coupled to one or more transmitters 73 and one or more receivers 80.

Figure 16:
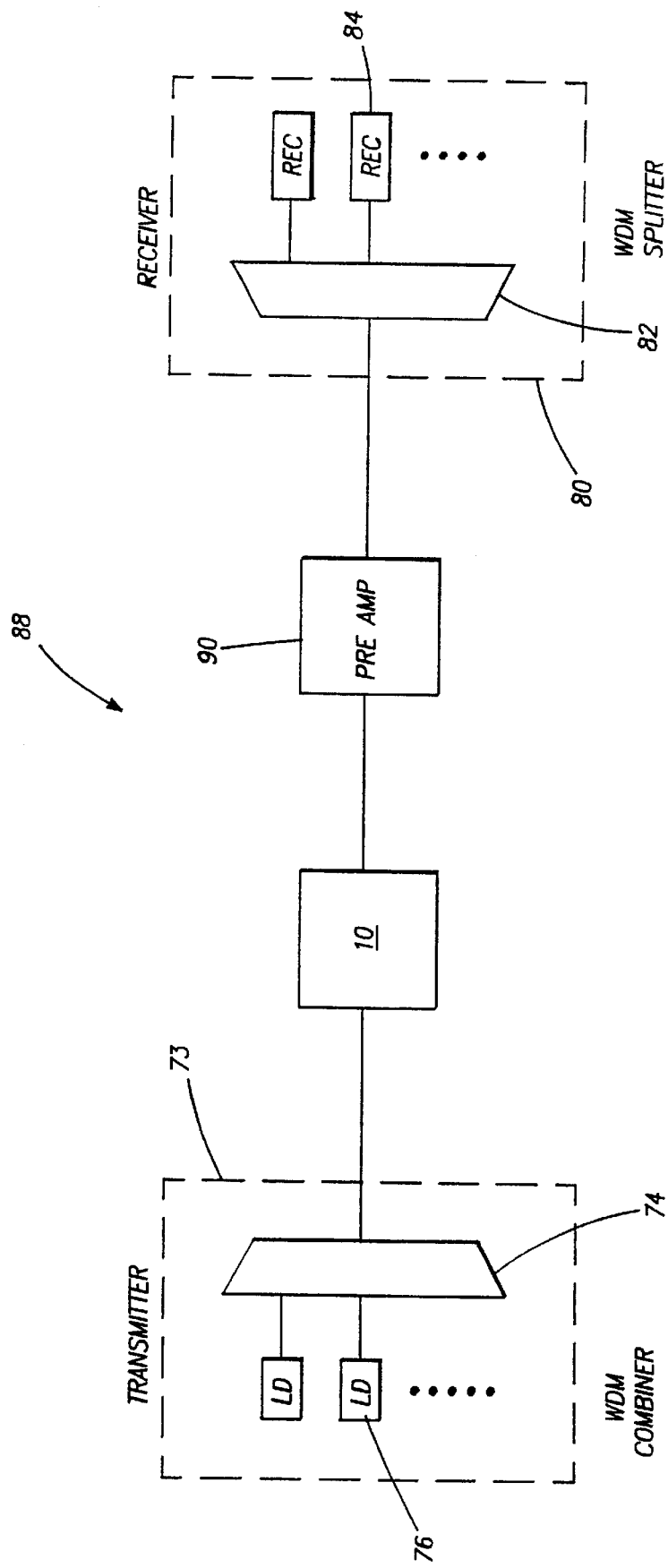
FIG. 16 is a schematic diagram of another embodiment of a broadband communication system of the present invention.

FIG. 16 illustrates another embodiment of the present invention which is a broadband communication system 88 that includes multi-stage optical amplifier 10 coupled to a broadband pre-amplifier 90. Multi-stage optical amplifier 10 is coupled to one or more transmitters 73 and broadband pre-amplifier 90 is coupled to one or more receivers 80.

Figure 17:
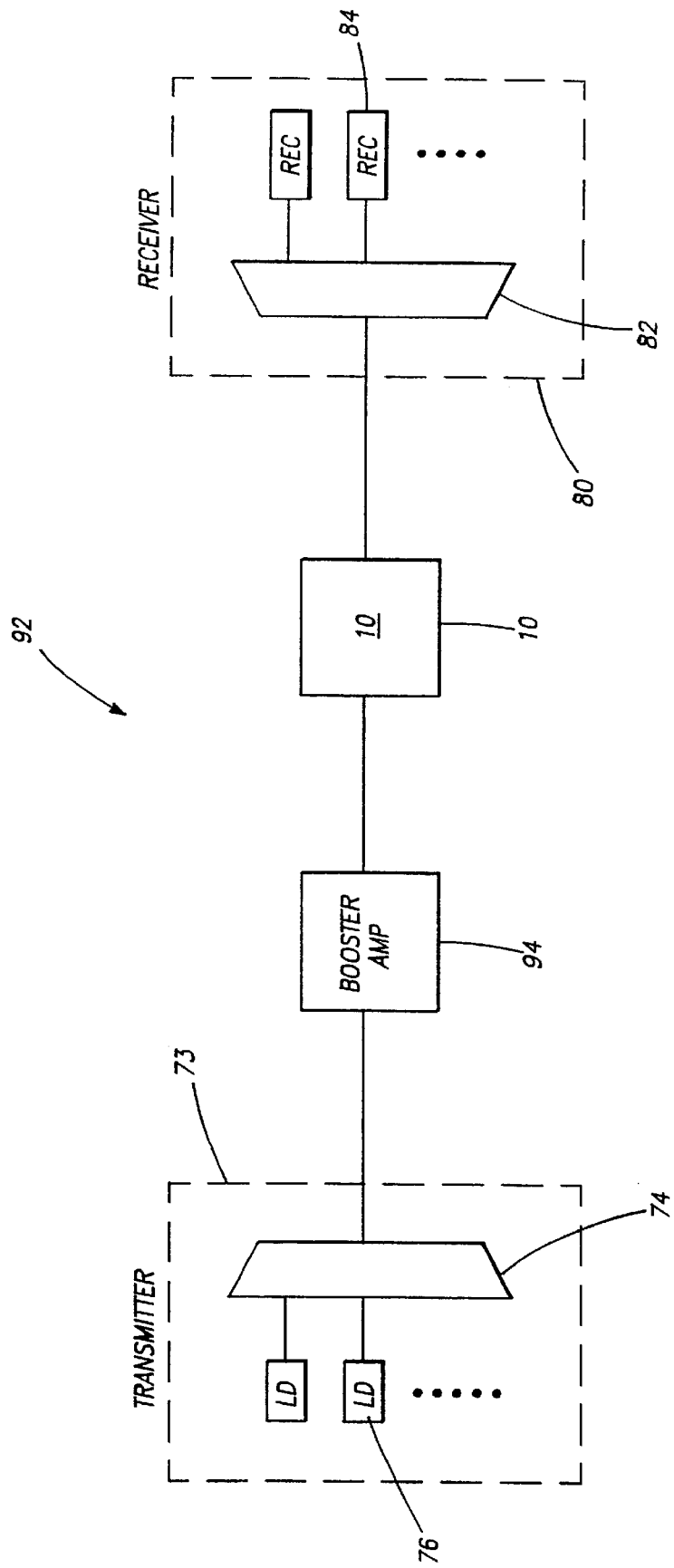
FIG. 17 is a schematic diagram of another embodiment of a broadband communication system of the present invention.

FIG. 17 illustrates yet another embodiment of a broadband communication system 92 with a broadband booster amplifier 94 coupled to multi-stage optical amplifier 10. One or more transmitters 73 is coupled to broadband booster amplifier 94. One or more receivers 80 is coupled to multi-stage optical amplifier 10.

Figure 18:
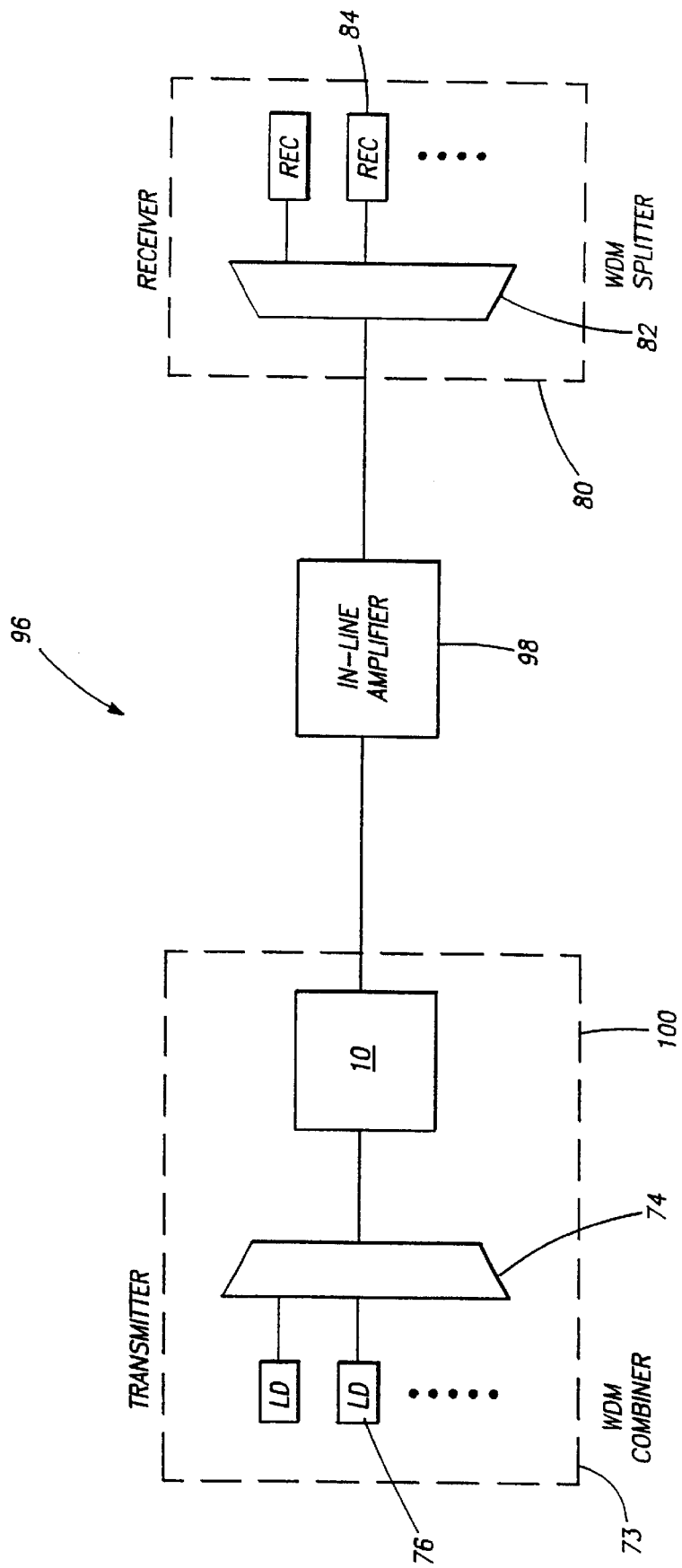
FIG. 18 is a schematic diagram of another embodiment of a broadband communication system of the present invention.

Another embodiment of a broadband communication system 96 is illustrated in FIG. 18. In this embodiment, an in-line amplifier 98 is coupled to receiver 80 and to a transmitter 100. Transmitter includes multi-stage optical amplifier 10 coupled to transmitter 73.

Figure 19:
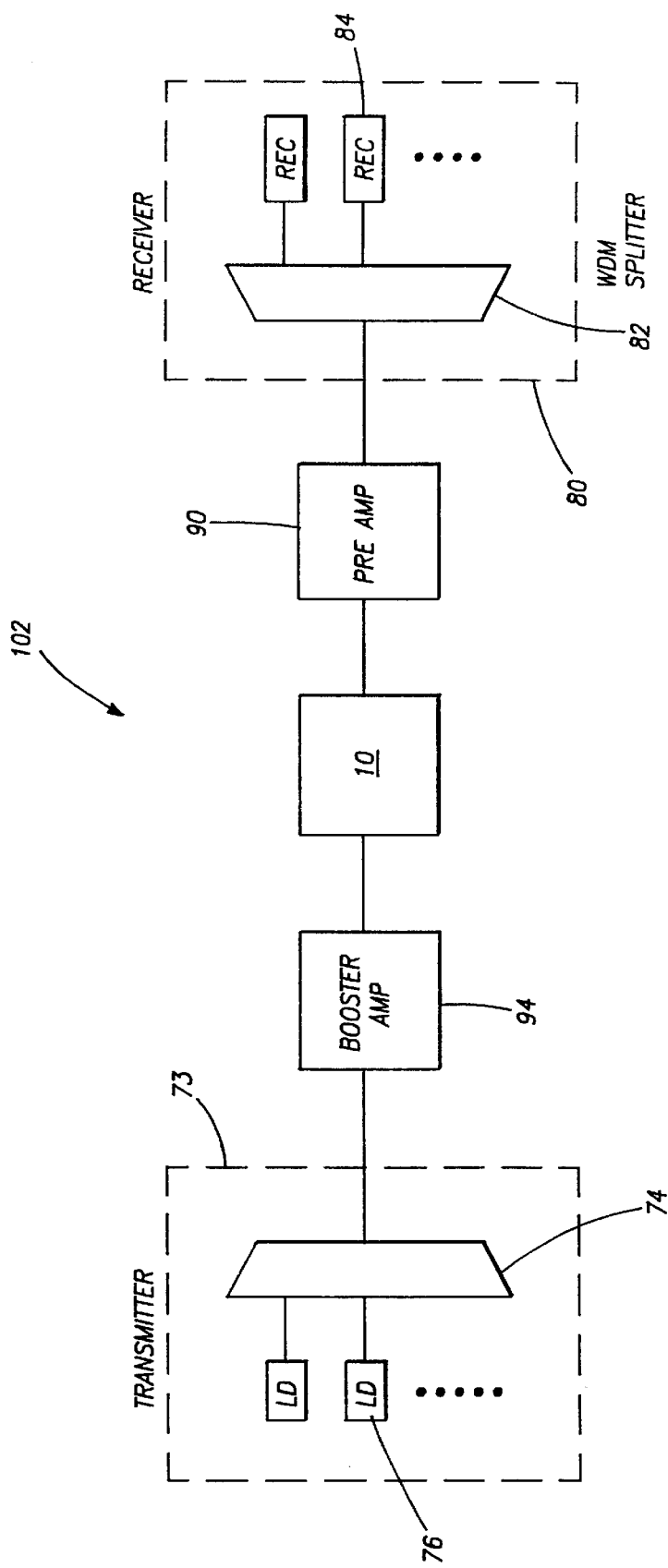
FIG. 19 is a schematic diagram of another embodiment of a broadband communication system of the present invention.

FIG. 19 illustrates another broadband communication system 102 of the present invention. Broadband communication system 102 includes multi-stage optical amplifier 10 coupled to broadband booster amplifier 94 and broadband pre-amplifier 90. Broadband booster amplifier 94 is coupled to one or more transmitters 73. Broadband pre-amplifier 90 is coupled to one or more receivers 80.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A multi-stage optical amplifier, comprising:
   one or more optical fibers including at least a distributed Raman amplifier fiber and a discrete Raman amplifier fiber, the one or more optical fibers configured to communicate with one or more signal sources producing a plurality of signal wavelengths $\lambda_s$ and at least two pump sources that produce one or more pump beam wavelengths $\lambda_p$, the distributed Raman amplifier fiber is configured to introduce an effective optical noise figure to at least a portion of the plurality of signal wavelengths $\lambda_s$ of less than 8 dB and less than an effective optical noise figure introduced by the discrete Raman amplifier fiber, wherein at least one of the one or more pump beam wavelengths $\lambda_p$ is shorter than at least a portion of the plurality of signal wavelengths $\lambda_s$, and wherein the discrete Raman amplifier fiber is capable of introducing a gain level to at least some of the plurality of wavelengths $\lambda_s$ of at least 5 dB;

a signal input port coupled to the one or more optical fibers;

a signal output port coupled to the one or more optical fibers;

a first pump input port, the distributed Raman amplifier fiber being positioned between the signal input port and the first pump input port and the discrete Raman amplifier fiber being positioned between the first pump input port and signal output port;

a second pump input port coupled to the one or more optical fibers and positioned between the first pump input port and the signal output port; and wherein the plurality of signal wavelengths $\lambda_s$ flow in a first direction and the one or more pump beam wavelengths $\lambda_p$ flow in a direction counter to the first direction, and wherein at least one of the distributed Raman amplifier and the discrete Raman amplifier comprises a dispersion compensating fiber.

2. The multi-stage optical amplifier of claim 1, wherein the first pump input port is coupled to a first pump source, and the second pump input port is coupled to a second pump source.

3. The multi-stage optical amplifier of claim 2, wherein the first pump source produces a pump beam comprising one or more wavelengths $\lambda_{p1}$ and the second pump source produces a pump beam comprising one or more wavelengths $\lambda_{p2}$.

4. The multi-stage optical amplifier of claim 3, wherein the one or more wavelengths $\lambda_{p1}$ and the one or more wavelengths $\lambda_{p2}$ are the same.

5. The multi-stage optical amplifier of claim 3, wherein at least a portion of the one or more wavelengths $\lambda_{p1}$ and the one or more wavelengths $\lambda_{p2}$ are different.

6. The multi-stage optical amplifier of claim 1, wherein the distributed and discrete Raman amplifier fibers have lengths greater than or equal to 200 meters.

7. The multi-stage optical amplifier of claim 1, wherein the one or more pump beam wavelengths $\lambda_p$ are in the range of 1300 nm to 1530 nm.

8. The multi-stage optical amplifier of claim 1, wherein at least a portion of the plurality of signal wavelengths $\lambda_s$ is in the range of 1430 to 1530 nm.

9. The multi-stage optical amplifier of claim 1, further comprising:

at least one WDM coupler to couple a pump path from the signal input port to the signal output port.

10. The multi-stage optical amplifier of claim 1, wherein the one or more optical fibers includes a third Raman amplifier fiber.

11. The multi-stage optical amplifier of claim 10, further comprising:

a third pump source coupled to the third Raman amplifier fiber.

12. The multi-stage optical amplifier of claim 11, wherein the one or more optical fibers includes a fourth Raman amplifier fiber.

13. The multi-stage optical amplifier of claim 2, wherein each of the first and second pump sources comprises a laser diode pump source.

14. The multi-stage optical amplifier of claim 2, further comprising:

at least a first lossy member positioned between the first pump input port and the signal output port, the at least first lossy member being lossy in at least one direction.

15. The multi-stage optical amplifier of claim 14, wherein the at least a first lossy member includes an optical isolator.

16. The multi-stage optical amplifier of claim 14, wherein the at least a first lossy member includes an add/drop multiplexer.

17. The multi-stage optical amplifier of claim 14, wherein the at least a first lossy member includes a gain equalization member.

18. The multi-stage optical amplifier of claim 14, wherein the at least a first lossy member includes a dispersion compensation element.

19. The multi-stage optical amplifier of claim 14, wherein the at least a first lossy member includes a WDM coupler.

20. A multi-stage optical amplifier, comprising:

one or more optical fibers including at least a distributed Raman amplifier fiber and a discrete Raman amplifier fiber, the one or more optical fibers configured to communicate with one or more signal sources producing a plurality of signal wavelengths $\lambda_s$ and at least two pump sources that produce one or more pump beam wavelengths $\lambda_p$, wherein at least one of the one or more pump beam wavelengths $\lambda_p$ is shorter than at least a portion of the plurality of signal wavelengths $\lambda_s$, and wherein at least one of the distributed Raman amplifier fiber and the discrete Raman amplifier fiber comprises an optical fiber cut-off wavelength that is shorter than at least one of the one or more pump beam wavelengths $\lambda_p$;

a signal output port coupled to the one or more optical fibers;

a first pump input port, the distributed Raman amplifier fiber being positioned between the signal input port and the first pump input port and the discrete Raman amplifier fiber being positioned between the first pump input port and signal output port; and a second pump input port coupled to the one or more optical fibers and positioned between the first pump input port and the signal output port.

21. The multi-stage optical amplifier of claim 20, wherein the optical fiber cut-off wavelength of the distributed Raman amplifier fiber is shorter than the one or more pump beam wavelengths $\lambda_p$.

22. The multi-stage optical amplifier of claim 20, wherein the optical fiber cut-off wavelength of the discrete Raman amplifier fiber is shorter than the one or more pump beam wavelengths $\lambda_p$.

23. The multi-stage optical amplifier of claim 20, wherein the first pump input port is coupled to a first pump source, and the second pump input port is coupled to a second pump source.

24. The multi-stage optical amplifier of claim 20, wherein the first pump source produces a pump beam comprising one or more wavelengths $\lambda_{p1}$, and the second pump source produces a pump beam comprising one or more wavelengths $\lambda_{p2}$.

25. The multi-stage optical amplifier of claim 24, wherein the one or more wavelengths $\lambda_{p1}$ and the one or more wavelengths $\lambda_{p2}$ are the same.

26. The multi-stage optical amplifier of claim 24, wherein at least a portion of the one or more wavelengths $\lambda_{p1}$ and the one or more wavelengths $\lambda_{p2}$ are different.

27. The multi-stage optical amplifier of claim 20, wherein the distributed and discrete Raman amplifier fibers have lengths greater than or equal to 200 meters.

28. The multi-stage optical amplifier of claim 20, wherein the one or more pump beam wavelengths $\lambda_p$ are in the range of 1300 nm to 1530 nm.

29. The multi-stage optical amplifier of claim 20, wherein at least a portion of the plurality of signal wavelengths $\lambda_s$ is in the range of 1430 to 1530 nm.

30. The multi-stage optical amplifier of claim 20, wherein an effective optical noise figure of the distributed Raman amplifier fiber is less than an optical noise figure of the discrete Raman amplifier fiber for at least a portion of the plurality of signal wavelengths.

31. The multi-stage optical amplifier of claim 20, wherein the discrete Raman amplifier fiber provides to at least some of the signal wavelengths $\lambda_s$ a higher gain than the distributed Raman amplifier fiber.

32. The multi-stage optical amplifier of claim 20, further comprising:
at least one WDM coupler to couple a pump path from the signal input port to the signal output port.

33. The multi-stage optical amplifier of claim 20, wherein at least one of the distributed and discrete Raman amplifier fibers comprises a dispersion compensating fiber.

34. The multi-stage optical amplifier of claim 20, wherein the distributed Raman amplifier fiber has an effective optical noise figure of less than 8 dB over the wavelengths $\lambda_s$.

35. The multi-stage optical amplifier of claim 20, wherein the discrete Raman amplifier fiber provides a gain level of at least 5 dB to at least some of the signal wavelengths $\lambda_s$.

36. The multi-stage optical amplifier of claim 20, wherein the one or more optical fibers includes a third Raman amplifier fiber.

37. The multi-stage optical amplifier of claim 36, further comprising:
a third pump source coupled to the third Raman amplifier fiber.

38. The multi-stage optical amplifier of claim 37, wherein the one or more optical fibers includes a fourth Ram an amplifier fiber.

39. The multi-stage optical amplifier of claim 20, wherein each of the first and second pump sources comprises a laser diode pump source.

40. The multi-stage optical amplifier of claim 20, further comprising:
at least a first lossy member positioned between the first pump input port and the signal output port, the at least first lossy member being lossy in at least one direction.

41. The multi-stage optical amplifier of claim 40, wherein the at least first lossy member includes an optical isolator.

42. The multi-stage optical amplifier of claim 40, wherein the at least first lossy member includes an add/drop multiplexer.

43. The multi-stage optical amplifier of claim 40, wherein the at least first lossy member includes a gain equalization member.

44. The multi-stage optical amplifier of claim 40, wherein the at least first lossy member includes a dispersion compensation element.

45. The multi-stage optical amplifier of claim 40, wherein the at least first lossy member includes a WDM coupler.

46. The multi-stage optical amplifier of claim 20, wherein the plurality of signal wavelengths $\lambda_s$ flow in a first direction and the one or more pump beam wavelengths $\lambda_p$ flow in a direction counter to the first direction.

47. A multi-stage optical amplifier, comprising:
one or more optical fibers including at least a distributed Raman amplifier fiber and a discrete Raman amplifier fiber, at least a portion of one of the distributed Raman amplifier fiber and the discrete Raman amplifier fiber comprising a dispersion compensating fiber, the one or more optical fibers configured to communicate with one or more signal sources producing a plurality of signal wavelengths $\lambda_s$ and at least two pump sources that produce one or more pump beam wavelengths $\lambda_p$;
a signal input port coupled to the one or more optical fibers;
a first pump input port, the distributed Raman amplifier fiber being positioned between the signal input port and the first pump input port and the discrete Raman amplifier fiber being positioned between the first pump input port and signal output port; and
a second pump input port coupled to the one or more optical fibers and positioned between the first pump input port and the signal output port.

48. The multi-stage optical amplifier of claim 47, wherein the dispersion compensating fiber has a zero dispersion point that is shifted to wavelengths greater than 1500 nm using a waveguide dispersion property.

49. The multi-stage optical amplifier of claim 47, wherein the plurality of signal wavelengths $\lambda_s$ flow in a first direction and the one or more pump beam wavelengths $\lambda_p$ flow in a direction counter to the first direction.

50. The multi-stage optical amplifier of claim 47, wherein the first pump input port is coupled to a first pump source, and the second pump input port is coupled to a second pump source.

51. The multi-stage optical amplifier of claim 47, further comprising:
at least a first lossy member positioned between the first pump input port and the signal output port, the at least first lossy member being lossy in at least one direction.

52. The multi-stage optical amplifier of claim 47, wherein the distributed and discrete Raman amplifier fibers have lengths greater than or equal to 200 meters.

53. A multi-stage optical amplifier, comprising:
one or more optical fibers including at least a distributed Raman amplifier fiber and a discrete Raman amplifier fiber, the one or more optical fibers configured to receive a plurality of signal wavelengths $\lambda_s$;
a signal input port coupled to the one or more optical fibers;
a first pump input port, the distributed Raman amplifier fiber being positioned between the signal input port and the first pump input port and the discrete Raman amplifier fiber being positioned between the first pump input port and signal output port;
a second pump input port coupled to the one or more optical fibers and positioned between the first pump input port and the signal output port; and
at least a first pump source coupled to one of the first and second pump input ports, the at least a first pump source including a plurality of pump sources comprising outputs that are combined using wavelength multiplexing and using, for at least one pump wavelength, polarization multiplexing.

54. The multi-stage optical amplifier of claim 53, wherein the plurality of pump sources include multiple gratings.

55. The multi-stage optical amplifier of claim 53, wherein at least a portion of the plurality of pump sources comprise laser diodes.

56. The multi-stage optical amplifier of claim 53, wherein at least a portion of the plurality of pump sources comprise laser diodes each producing an output wavelength that is stabilized by at least one grating.

57. The multi-stage optical amplifier of claim 53, wherein the plurality of signal wavelengths $\lambda_s$ flow in a first direction and the one or more pump beam wavelengths $\lambda_p$ flow in a direction counter to the first direction.

58. The multi-stage optical amplifier of claim 53, further comprising:
   at least a first lossy member positioned between the first pump input port and the signal output port, the at least first lossy member being lossy in at least one direction.

59. A multi-stage optical amplifier system, comprising:
   a plurality of transmitters that produce a plurality of signal wavelengths $\lambda_s$;
   a multi-stage optical amplifier comprising:
      one or more optical fibers including at least a distributed Raman amplifier fiber and a discrete Raman amplifier fiber, the one or more optical fibers communicating with the plurality of transmitters and configured to be coupled to at least two pump sources that produce one or more pump beam wavelengths $\lambda_p$, the distributed Raman amplifier fiber is capable of introducing an effective optical noise figure to at least a portion of the plurality of signal wavelengths $\lambda_s$ of less than 8 dB and less than an effective optical noise figure introduced by the discrete Raman amplifier fiber, wherein at least one of the one or more pump beam wavelengths $\lambda_p$ is shorter than at least a portion of the plurality of signal wavelengths $\lambda_s$, wherein the discrete Raman amplifier fiber is capable of introducing a gain level to at least some of the plurality of wavelengths $\lambda_s$ of at least 5 dB, and wherein at least one of the distributed Raman amplifier and the discrete Raman amplifier comprises a dispersion compensating fiber;
      a signal input port coupled to the one or more optical fibers;
      a signal output port coupled to the one or more optical fibers;
      a first pump input port, the distributed Raman amplifier fiber being positioned between the signal input port and the first pump input port and the discrete Raman amplifier fiber being positioned between the first pump input port and signal output port;
      a second pump input port coupled to the one or more optical fibers and positioned between the first pump input and the signal output port, wherein the plurality of signal wavelengths $\lambda_s$ flow in a first direction and the one or more pump beam wavelengths $\lambda_p$ flow in a direction counter to the first direction; and
   a plurality of receivers coupled to the multi-stage optical amplifier.

60. A multi-stage optical amplifier system, comprising:
   a plurality of transmitters that produce a plurality of signal wavelengths $\lambda_s$;
   a multi-stage optical amplifier comprising:
      one or more optical fibers including at least a distributed Raman amplifier fiber and a discrete Raman amplifier fiber, the one or more optical fibers communicating with the plurality of transmitters and configured to be coupled to at least two pump sources that produce one or more pump beam wavelengths $\lambda_p$, wherein the at least one of one or more pump beam wavelengths $\lambda_p$ are shorter than at least a portion of the plurality of signal wavelengths $\lambda_s$, and wherein at least one of the distributed Raman amplifier fiber and the discrete Raman amplifier fiber comprises an optical fiber cut-off wavelength that is shorter than at least one of the one or more pump beam wavelengths $\lambda_p$;
      a signal output port coupled to the one or more optical fibers;
      a first pump input port, the distributed Raman amplifier fiber being positioned between the signal input port and the first pump input port and the discrete Raman amplifier fiber being positioned between the first pump input port and signal output port;
      a second pump input port coupled to the one or more optical fibers and positioned between the first pump input port and the signal output port; and
   a plurality of receivers coupled to the multi-stage optical amplifier.

61. The multi-stage optical amplifier system of claim 60, wherein the optical fiber cut-off wavelength of the distributed Raman amplifier fiber is shorter than the one or more pump beam wavelengths $\lambda_p$.

62. The multi-stage optical amplifier system of claim 60, wherein the optical fiber cut-off wavelength of the discrete Raman amplifier fiber is shorter than the one or more pump beam wavelengths $\lambda_p$.

63. A multi-stage optical amplifier system, comprising:
   a plurality of transmitters that produce a plurality of signal wavelengths $\lambda_s$;
   a multi-stage optical amplifier comprising:
      one or more optical fibers including at least a distributed Raman amplifier fiber and a discrete Raman amplifier fiber, at least a portion of one of the distributed Raman amplifier fiber and the discrete Raman amplifier fiber comprises a dispersion compensating fiber, the one or more optical fibers facilitating communication with the plurality of transmitters and configured to be coupled to at least two pump sources that produce one or more pump beam wavelengths $\lambda_p$;
      a signal input port coupled to the one or more optical fibers, a first pump input port, the distributed Raman amplifier fiber being positioned between the signal input port and the first pump input port and the discrete Raman amplifier fiber being positioned between the first pump input port and signal output port;
      a second pump input port coupled to the one or more optical fibers and positioned between the first pump input port and the signal output port; and
   a plurality of receivers coupled to the multi-stage optical amplifier.

64. The multi-stage optical amplifier system of claim 63, further comprising:
   a transmission fiber coupled between the plurality of transmitters and the one or more optical fibers.

65. The multi-stage optical amplifier system of claim 64, wherein the dispersion compensating fiber has an approximately opposite sign of dispersion slope and an approximately opposite sign of dispersion relative to the transmission fiber.

66. A multi-stage optical amplifier system, comprising:
   a plurality of transmitters that produce a plurality of signal wavelengths $\lambda_s$;

a multi-stage optical amplifier comprising:
one or more optical fibers facilitating communication with the plurality of transmitters and including at least a distributed Raman amplifier fiber and a discrete Raman amplifier fiber;
a signal input port coupled to the one or more optical fibers;
a first pump input port, the distributed Raman amplifier fiber being positioned between the signal input port and the first pump input port and the discrete Raman amplifier fiber being positioned between the first pump input port and signal output port;
a second pump input port coupled to the one or more optical fibers and positioned between the first pump input port and the signal output port;
at least a first pump source coupled to one of the first and second pump input ports, the at least a first pump source including a plurality of pump sources with outputs that are combined using wavelength multiplexing and using, for at least one pump wavelength, polarization multiplexing; and
a plurality of receivers coupled to the multi-stage optical amplifier.

67. The multi-stage optical amplifier of claim 1, wherein the discrete Raman amplifier fiber is capable of introducing a gain level to at least a majority of the plurality of wavelengths $\lambda_s$ of at least 5 dB.

68. The multi-stage optical amplifier of claim 47, wherein the discrete Raman amplifier fiber is capable of introducing a gain level to at least a majority of the plurality of $\lambda_s$ of at least 5 dB.

69. The multi-stage optical amplifier system of claim 63, wherein the discrete Raman amplifier fiber is capable of introducing a gain level to at least a majority of the plurality of $\lambda_s$ of at least 5 dB.

\* \* \* \* \*